(12) United States Patent
Sharp et al.

(10) Patent No.: US 11,002,955 B2
(45) Date of Patent: May 11, 2021

(54) REVERSE-ORDER CROSSED PANCAKE LENS WITH INDEX GRADIENT STRUCTURE

(71) Applicant: Facebook Technologies, LLC, Menlo Park, CA (US)

(72) Inventors: Gary Dean Sharp, Boulder, CO (US); Jacques Gollier, Bellevue, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 285 days.

(21) Appl. No.: 16/159,757

(22) Filed: Oct. 15, 2018

(65) Prior Publication Data

US 2019/0377184 A1 Dec. 12, 2019

Related U.S. Application Data

(60) Provisional application No. 62/682,041, filed on Jun. 7, 2018.

(51) Int. Cl.
*G02B 27/00* (2006.01)
*G02B 27/28* (2006.01)
(Continued)

(52) U.S. Cl.
CPC ....... *G02B 27/0018* (2013.01); *G02B 5/3058* (2013.01); *G02B 5/3066* (2013.01);
(Continued)

(58) Field of Classification Search
CPC .. G02B 27/283; G02B 5/3083; G02B 5/3041; G02B 5/305; G02B 5/3066; G02B 2027/011; G02B 2027/0136; G02B 2027/015; G02B 2027/0165; G02B 27/0025; G02B 27/0101; G02B 27/0149; G02B 27/0172; G02B 27/286; G02B 27/288; G02B 27/30; G02B 30/27;
(Continued)

(56) References Cited

U.S. PATENT DOCUMENTS 5,349,379 A 9/1994 Eichenlaub
5,410,345 A 4/1995 Eichenlaub
(Continued)

FOREIGN PATENT DOCUMENTS

WO 94/06249 A1 3/1994

OTHER PUBLICATIONS

International Search Report and Written Opinion received for PCT Application Serial No. PCT/US2018/064366 dated Apr. 3, 2019, 18 pages.
(Continued)

*Primary Examiner* — Brandi N Thomas
(74) *Attorney, Agent, or Firm* — FisherBroyles, LLP

(57) ABSTRACT

In various embodiments, a reverse-order crossed pancake lens block having an index gradient structure may include an optical element configured to transmit at least a portion of radiation from a radiation source. Moreover, the pancake lens block may include an index-gradient structure that is spaced at a distance from the optical element, the distance configured to provide an optical path length in the pancake lens block. The index-gradient structure may be configured to provide an anti-reflective property to at least one surface of the optical element.

19 Claims, 11 Drawing Sheets

(51) Int. Cl.
*G02B 5/30* (2006.01)
*G02B 27/01* (2006.01)
*G02B 27/09* (2006.01)

(52) U.S. Cl.
CPC ....... *G02B 5/3083* (2013.01); *G02B 27/0025* (2013.01); *G02B 27/0037* (2013.01); *G02B 27/0093* (2013.01); *G02B 27/0172* (2013.01); *G02B 27/0983* (2013.01); *G02B 27/283* (2013.01); *G02B 27/286* (2013.01)

(58) Field of Classification Search
CPC .... G02B 3/005; G02B 3/0056; G02B 5/3016; G02B 5/3025
USPC .................................................. 359/619–633
See application file for complete search history.

(56) References Cited

U.S. PATENT DOCUMENTS

| | | | |
|---|---|---|---|
| 5,428,366 | A | 6/1995 | Eichenlaub |
| 5,973,760 | A | 10/1999 | Dehmlow |
| 6,583,930 | B1 | 6/2003 | Schrenk et al. |
| 8,780,285 | B1 | 7/2014 | Stuppi et al. |
| 9,110,245 | B2 | 8/2015 | Derks et al. |
| 9,513,420 | B2 | 12/2016 | Derks et al. |
| 2005/0179048 | A1 | 8/2005 | Yamanaka et al. |
| 2007/0070508 | A1 | 3/2007 | Ruhle et al. |
| 2010/0177113 | A1 | 7/2010 | Gay et al. |
| 2012/0120365 | A1 | 5/2012 | Legerton et al. |
| 2017/0045737 | A1 | 2/2017 | Cammenga et al. |
| 2017/0068029 | A1 | 3/2017 | Yun et al. |
| 2017/0068096 | A1 | 3/2017 | Ouderkirk et al. |
| 2017/0168302 | A1 | 6/2017 | McDowall et al. |
| 2017/0255015 | A1 | 9/2017 | Geng et al. |
| 2018/0031835 | A1 | 2/2018 | Hoppe |
| 2018/0059296 | A1 | 3/2018 | Ouderkirk et al. |
| 2018/0101020 | A1 | 4/2018 | Gollier et al. |
| 2018/0120579 | A1* | 5/2018 | Gollier ................ G02B 3/06 |

OTHER PUBLICATIONS

International Search Report and Written Opinion received for PCT Application Serial No. PCT/US2018/064362 dated Mar. 29, 2019, 11 pages.

International Search Report and Written Opinion received for PCT Application Serial No. PCT/US2018/064363 dated Mar. 28, 2019, 18 pages.

Sharp, Gary Dean, "Head Mounted Display Including a Reverse-Order Crossed Pancake Lens", U.S. Appl. No. 16/160,128, filed Oct. 15, 2018, 95 pages.

Sharp, Gary Dean, "Reverse-Order Crossed Pancake Lens With Azimuthal Compensation", U.S. Appl. No. 16/159,747, filed Oct. 15, 2018, 85 pages.

Sharp, Gary Dean, "Reverse-Order Crossed Pancake Lens With a Shaped Polarizer", U.S. Appl. No. 16/159,752, filed Oct. 15, 2018, 87 pages.

Escuti et al., "Geometric-Phase Holograms", Optics & Photonics News, Feb. 2016, 8 pages.

Pancharatnam, S., "Generalized Theory of Interference, and its Applications", Part I, Coherent Pencils, Memoir No. 88 of the Raman Research Institute, Oct. 30, 1956, pp. 247-262, Bangalore, India.

3M Optical Systems, "Vikuiti Dual Brightness Enhancement Film—Matte (DBEF-M)", URL: multimedia.3m.com/mws/media/152671O/vikuiti-tm-dbef-m.pdf, 2008, 4 pages.

* cited by examiner

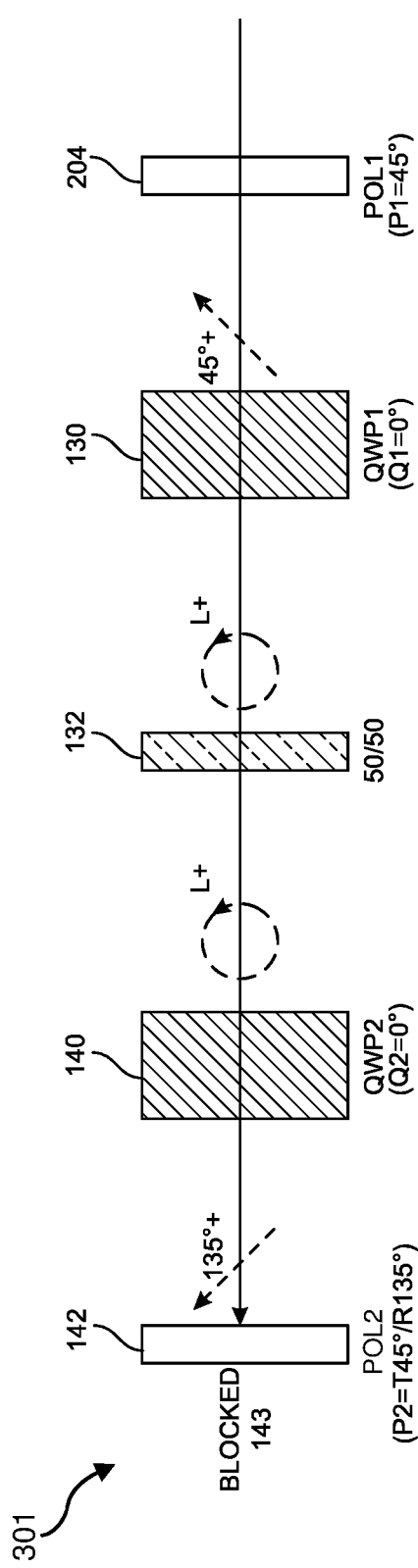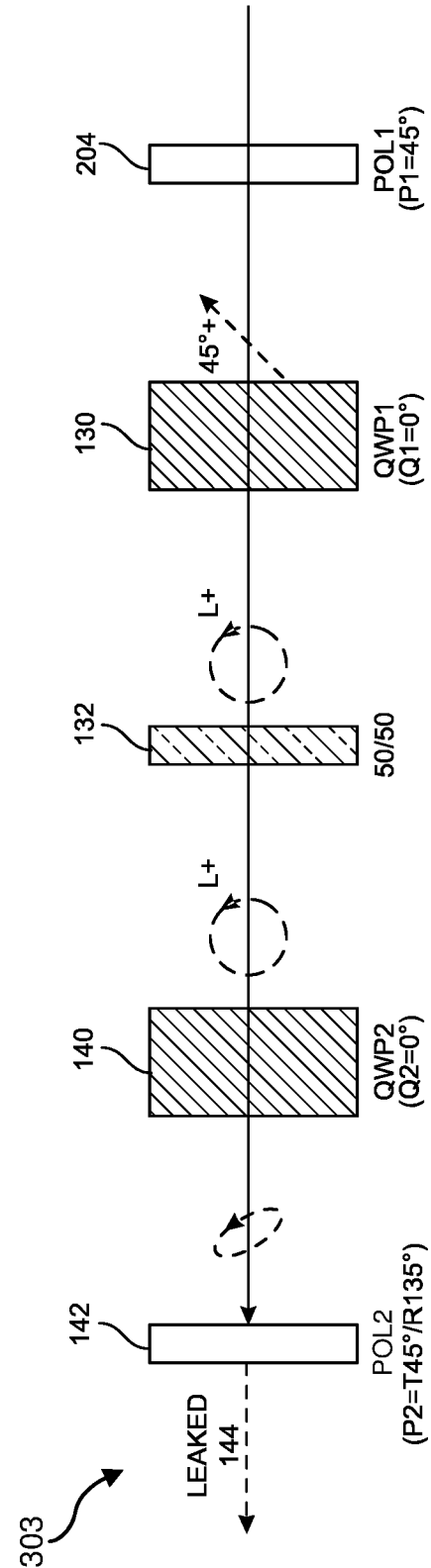

REVERSE-ORDER CROSSED PANCAKE LENS WITH INDEX GRADIENT STRUCTURE

CROSS REFERENCE TO RELATED APPLICATION

This application is a non-provisional utility application which claims the benefit of U.S. Provisional Application No. 62/682,041 filed 7 Jun. 2018, the disclosure of which is incorporated, in its entirety, by this reference.

BACKGROUND

In a head-mounted display (HMD), a user's eye typically occupies a region of space generally referred to as an eye box, and a respective eye box may be provided for each of the user's eyes. HMDs often display and direct content to the eye boxes, for example, using one or more optical elements. Unfortunately, light reflected between the various optical elements within the HMD may generate parasitic light in the process. This may lead to reduced contrast in the content being presented to the user. In particular, systems with polarizing elements may introduce parasitic light and/or ghost images that may reduce image quality and, thus, the user's overall experience.

SUMMARY

As will be described in greater detail below, the instant disclosure describes various display apparatuses and systems including pancake lenses having index gradient structures and corresponding methods for manufacturing the same. In various embodiments, a pancake lens block may include (i) an optical element configured to transmit at least a portion of radiation from a radiation source, and (ii) a first index-gradient structure spaced at a distance from the optical element, the distance configured to provide an optical path length in the pancake lens block. The first index-gradient structure may be configured to provide an anti-reflective property to at least one surface of the optical element.

In an embodiment, the optical element may include (i) a first retarder oriented to a first axis of orientation, where the first retarder may be configured to selectively transmit a portion of the radiation from the radiation source, (ii) a partial reflector that receives the portion of radiation from the first retarder and transmits the portion of radiation, (iii) a second retarder oriented to a second axis of orientation substantially orthogonal to the first axis of orientation, where the second retarder may be configured to transmit the portion of radiation from the partial reflector, and (iv) a reflective polarizer configured to reflect the portion of radiation transmitted by the second retarder back to the partial reflector through the second retarder, where the partial reflector reflects a second portion of the radiation from the second retarder back to the reflective polarizer. In some embodiments, a first surface of the first index-gradient structure may be coupled to the surface of the second retarder. In an embodiment, the pancake lens block may further include a second index-gradient structure configured to provide an anti-reflective property to a surface of the reflective polarizer, the second index-gradient structure coupled to the surface of the reflective polarizer at a first surface of the second index-gradient structure.

In an embodiment, the first index-gradient structure may include a moth-eye structure. Further, there may be first protrusions on a second surface of the first index-gradient structure, the first protrusions each having dimensions smaller than a wavelength of the portion of radiation. In an embodiment, the second index-gradient structure may include a second moth-eye structure. Further, there may be second protrusions on the second surface of the second index-gradient structure, the second protrusions having dimensions smaller than a wavelength of the portion of radiation. In an embodiment, at least a portion of the first protrusions or at least a portion of the second protrusions may be distributed in an array having a horizontal periodicity of about 1 protrusion every 10 nm to about 500 nm. In some embodiments, the first protrusions or the second protrusions may include at least one of conical shaped nanostructures, frustoconical shaped nanostructures, pyramid shaped nanostructures, trapezoidal shaped nanostructures, or truncated pyramid shaped nanostructures. Further, each of the first or second protrusions individually may include a height of about 10 nm to about 1000 nm. In an embodiment, the first index-gradient structure or the second index-gradient structure may include a film having a thickness of about 1 µm to about 20 µm.

In an embodiment, at least one of (i) the first index-gradient structure may be coupled to the surface of the optical element using a first adhesive material, or (ii) the second index-gradient structure may be coupled to the surface of the optical element using a second adhesive material. In an embodiment, the first adhesive material may include a first index of refraction that is substantially similar to at least one of an index of refraction of the optical element or an index of refraction of the first index-gradient structure. Further, the second adhesive material may include a second index of refraction that is substantially similar to at least one of an index of refraction of the optical element or an index of refraction of the second index-gradient structure.

In an embodiment, the distance may be provided by at least one of an air gap or a material. The material may include a nanovoided material. In an embodiment, the first index-gradient structure or the second index-gradient structure may include an oxide material. Further, the oxide material may include a tungsten oxide, an iron oxide, or an aluminum oxide. In an embodiment, the first index-gradient structure or the second index-gradient structure may include a polymer. Further, the polymer may include a silicone, a thiol, or a polyurethane.

In an embodiment, the surface of the optical element may be a first surface. Further, the first index-gradient structure may be nanoimprinted on the first surface of the optical element. Additionally or alternatively, the second index-gradient structure may be nanoimprinted on a second surface of the optical element. In an embodiment, the surface of the optical element may be a first surface and the first index-gradient structure may be disposed on a substrate. Further, the substrate may be laminated to the first surface of the optical element. In an embodiment, the surface of the optical element may be a first surface and the second index-gradient structure may be disposed on a substrate. Further, the substrate may be laminated to a second surface of the optical element. Moreover, at least one of the first surface or a second surface of the optical element may be convex, concave, flat, or irregular. In at least one embodiment the first index-gradient structure and/or the second index-gradient structure may have a reflectivity that is less than or equal to approximately 0.4% for incident light having from normal incidence to an angle of approximately 30 degrees with respect to normal over a wavelength range of approximately 430 nm to approximately 660 nm.

In various embodiments, a head mounted display may include (i) an electronic display configured to emit image light, and (ii) a pancake lens block. The pancake lens block may further include an optical element configured to transmit at least a portion of the image light; and a first index-gradient structure spaced at a distance from the optical element. Additionally, the distance may be configured to provide an optical path length in the pancake lens block. Further, the first index-gradient structure may be configured to provide an anti-reflective property to a surface of the optical element.

A corresponding method for producing a pancake lens block may include (i) configuring an optical element within a pancake lens block to transmit at least a portion of radiation from a radiation source and (ii) spacing a first index-gradient structure at a distance from the optical element. In this example, the distance may be configured to provide an optical path length in the pancake lens block, and the first index-gradient structure may be configured to provide an anti-reflective property to a surface of the optical element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying figures and appendices illustrate a number of exemplary embodiments and are a part of the specification. Together with the following description, these figures and appendices demonstrate and explain various principles of the instant disclosure.

FIG. 3B shows an exemplary pancake lens block configuration (aligned to produce polarization leakage with wavelength and ray angle) that blocks light during a first see-through path at the designed wavelength (so both compound retarders serve as quarter-waveplates), in accordance with one embodiment.

FIG. 3C shows an exemplary pancake lens block configuration (aligned to produce the polarization leakage with wavelength and ray angle) that leaks light during a first see-through path for another wavelength (so both compound retarders do not serve as quarter-waveplates), in accordance with one embodiment.

Figure 1:
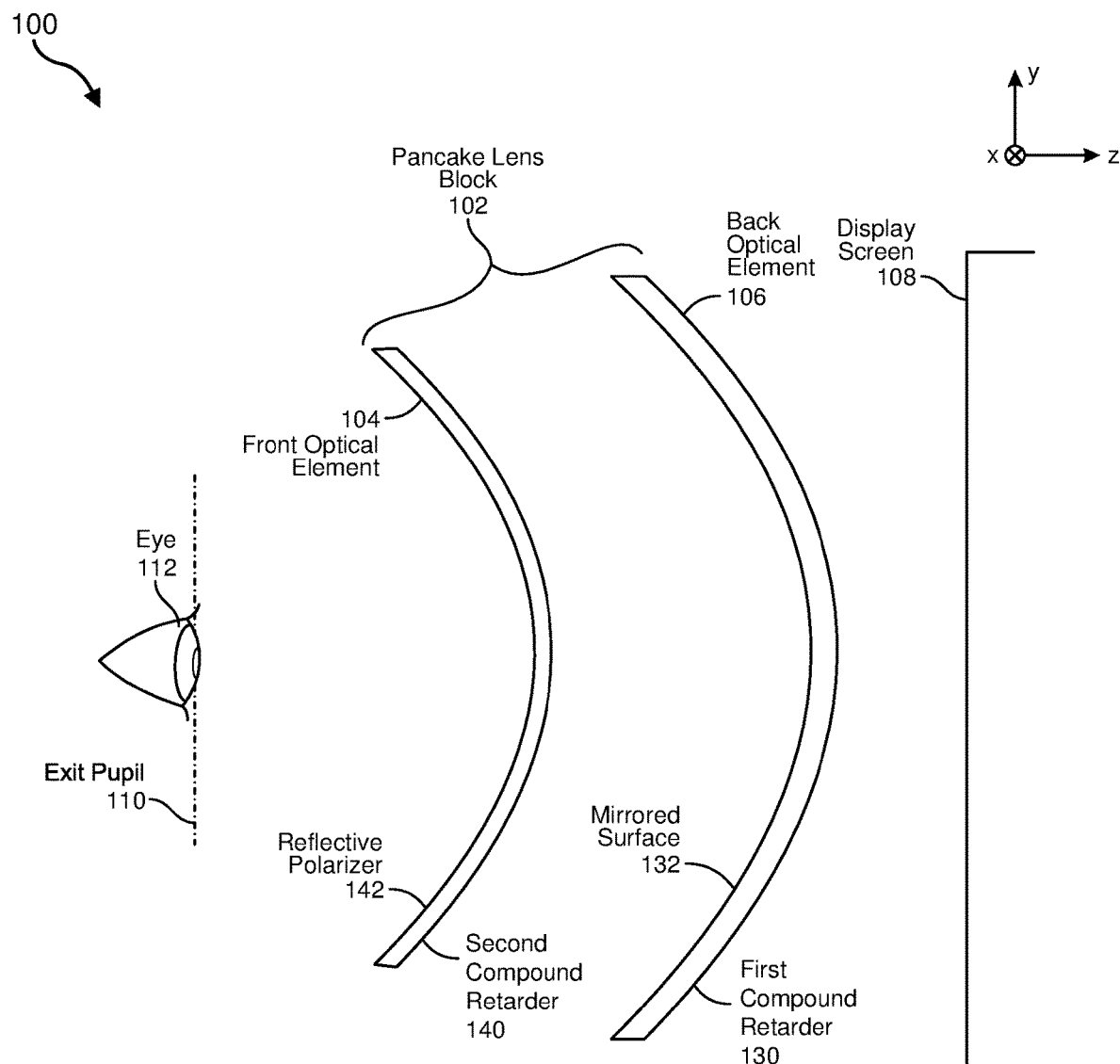
FIG. 1 shows an example pancake lens block, in accordance with one embodiment.

Throughout the figures, identical reference characters and descriptions indicate similar, but not necessarily identical, elements. While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, equivalents, and alternatives falling within this disclosure.

DETAILED DESCRIPTION OF EXEMPLARY EMBODIMENTS

The present disclosure is generally directed to enhancing images from electronic displays, and more specifically to reducing light leakage within an optical system including electronic displays.

In some embodiments, a reverse-order crossed (ROC) architecture for a pancake lens may include a first polarizer (e.g., linear polarizer), a first compound retarder (e.g., a retarder including multiple individual retarders, such as quarter-wave plates (QWPs)), a partial reflector, a second compound retarder (e.g., a retarder including multiple QWPs), and a reflective (e.g., beam-splitting) polarizer. In some embodiments, the term "compound retarder" may refer to an engineered stack of retarders (e.g., linear retarders), where the retardation and orientation of each layer in the stack may be designed to transform radiation (e.g., light) of a particular input polarization to radiation of a prescribed output polarization as a function of wavelength. Light received (e.g., from a display) may propagate through the pancake lens, where the light may undergo multiple controlled reflections and transmissions achieved by coordinating changes in polarization of light through these optical elements. In some embodiments, the first compound retarder and the second compound retarder may include a plurality of retarders (e.g., retarders including QWPs), for example, two, three, four, or more retarders.

The term "compound retarder" can be used to describe an engineered stack of linear retarders that may serve to generate a specified polarization transformation as a function of wavelength. In some instances, the compound retarder may serve to convert a uniform linear state of polarization (SOP) to a uniform circular SOP. The term may be used to encompass all such structures, without the additional constraint that the structure behave as a composite linear retarder (i.e. that it have linear eigen-polarizations).

In some embodiments, to prevent parasitic light (e.g., ghost images) from degrading image quality, an optical axis (e.g., a fast axis or a slow axis) of the second compound retarder may be oriented approximately ninety degrees (orthogonal) relative to the optical axis of the first compound retarder (i.e., corresponding to the "cross" configuration designation of the reverse-order crossed pancake lens block). Further, the first compound retarder and the second compound retarder may each include multiple retarders (e.g., three QWPs) arranged in a stack. In some embodiments, the order of the multiple retarding elements (e.g., QWPs) included in the first compound retarder-stack and the order for the multiple retarding elements for the second compound retarder-stack may be the reverse of one another, yielding the "reverse-order" configuration nomenclature of the ROC. For example, first, second, and third QWPs (e.g., labeled as A, B, and C) in the first compound retarder may map to third, second, and first QWPs (e.g., labeled as C, B, and A) in the second compound retarder.

In some embodiments, the ROC architecture may be implemented independently of the retardation magnitude or the axis of orientation of any given retarding element (e.g., any given QWP) of the compound retarding elements. In some embodiments, the optical axis of orientation of the retarders (e.g., the QWPs) in the compound retarders may be the fast axis (e.g., corresponding to the optical axis of orientation for a retarder including a negative uniaxial material) or the slow axis (e.g., corresponding to the optical axis of orientation for a retarder including a positive uniaxial material), or some other axis by which the retarding elements are oriented relative to each other. The compound retarders may additionally exhibit the same or similar behavior with respect to retardance variation versus wavelength and incidence angle.

In some embodiments, the ROC architecture may serve to change a spectral shape of a transformation function that light undergoes during the light's traversal through the first and second compound retarders of the pancake lens block. Further, while the ROC architecture described herein may be designed for visible light, in other embodiments, the transformation function of a pancake lens block may also be designed for radiation of different wavelength ranges (e.g., infrared radiation, ultraviolet radiation, and the like).

In another embodiment, a first compound retarder may be considered as a "black box" (e.g., a device which can be viewed in terms of its inputs and outputs) that may convert linearly polarized light to circularly polarized light in a range (e.g., visible range) of wavelengths. Moreover, a similarly designed second compound retarder having a compound optical axis that is rotated by approximately ninety degrees with respect to the first compound retarder compound optical axis may be used in the pancake lens block to convert the light traversed through the first compound retarder and the second compound retarder back to linearly polarized light having the same orientation as the orientation of the originally incident light on the first compound retarder.

In another embodiment, the first compound retarder may be a contrast determining element that may be sensitive to small optical imperfections. Therefore, the output of the first compound retarder may not be light having circular polarization, but rather, may be light having elliptical polarization, which may lead to compounding optical effects in the pancake lens. In some embodiments, the greater the number of components (e.g., five QWPs, or any odd number of QWPs) in a given compound retarder, the better the compound retarder may transform the linearly polarized light to circularly polarized light for light having normal incidence. For such a multi-layer (e.g., five layer) compound retarder, a second, substantially similar compound retarder in a ROC configuration placed in series with the multi-layer compound retarder may be able to transform the SOP of the originally incident light and thereby restore the original linear polarization of the light. However, when the incident light on the multi-layer compound retarders in the ROC configuration is off-normal, such multi-layer compound retarders may distort the polarization state of the light.

In another embodiment, for an ROC pancake lens block including two compound retarders in series, the two compound retarders may have no net effect on the polarization state of light at the output of the two compound retarders if the interim polarization state (e.g., the polarization state of the light at the output of the first compound retarder and before the input of the second compound retarder) is circularly polarized, assuming normally incident light at the input of the first compound retarder. If the interim polarization state of the light is not circular polarization, the two compound retarders may not fully restore the linear polarization state of the light at the output of the second compound retarder, leading to reduced contrast in the pancake lens block. In some embodiments, a pair of compound retarders in the ROC arrangement may restore the input state-of-polarization of light at normal incidence, at least in part because the composite Jones matrix corresponding to the compound retarders in the ROC arrangement is an identity matrix. Further, the composite Jones matrix may be the identity matrix regardless of the transformation associated with the first compound retarder or the corresponding number of retarders (e.g., number of QWPs), optical axes of orientation of the retarders (e.g., angles of the QWPs), and the retardation values of the retarders (e.g., retardation values of the QWPs) used in the first compound retarder. In some embodiments, a deviation from the ROC relationship between the compound retarders may result in a departure from the identity matrix for the composite Jones matrix associated with the ROC pancake lens block.

In some embodiments, the retardances of the constituent elements (e.g., constituent QWPs) for each of the compound retarders may be equal, and the axes of orientations of the constituent elements (e.g., axes of orientation of the constituent QWPs) of the two compound retarders may be crossed (e.g., made orthogonal to one another) between the two compound retarders. In some embodiments, the polarization state of light may be a circular polarization at the midpoint (e.g., the output of the first compound retarder and the input of the second compound retarder). Further, the polarization state (e.g., linear polarization) of the light incident on the first compound retarder may be restored at the output of the second compound retarder (e.g., the same linear polarization). In another embodiment, a trade-off in the design of the ROC pancake lens architecture may exist in that designs that may accommodate for wide-angles of incidence may require small component counts (e.g., three QWPs in each compound retarder), while designs that are optimized for achromaticity and the generation of circular polarization at the midpoint between compound retarders may favor high component counts (e.g., greater than three QWPs in each compound retarder).

FIG. 1 shows a cross sectional view 100 of an embodiment of pancake lens block 102 in accordance with one embodiment. In another embodiment, pancake lens block 102 may be configured to provide a folded optical path by utilizing polarizing optical components and providing optical power in a compact optical system. Pancake lens block 102, in some embodiments, may be part of a head-mounted display and may include front optical element 104 and back optical element 106 that focuses light from electronic display screen 108 to exit pupil 110 where an eye 112 of a user is positioned when viewing content on electronic display screen 108.

For purposes of illustration, FIG. 1 shows a cross section 100 of pancake lens block 102 associated with a single eye 112, but another pancake lens assembly, separate from pancake lens block 102 shown in FIG. 1, may provide altered image light to another eye of the user. Some embodiments of the pancake lens have different components than those described here. Similarly, in some cases, functions may be distributed among the components in a different manner than is described here.

Light emitted from electronic display 108 may be linearly polarized. In some embodiments, electronic display 108 includes one or more linear polarizers (POL1, to be shown and described in connection with FIG. 2, below) that linearly polarize light emitted from electronic display 108. Alternatively, light emitted from light emitting components (e.g., light-emitting diodes, LEDs) may be emitted as linearly polarized light.

Pancake lens block 102 illustrated in FIG. 1 includes front optical element 104 and back optical element 106. One or more surfaces of front optical element 104 and back optical element 106 may be shaped, for example, to correct for one or more optical aberrations, such as field curvature. For example, one or more surfaces of front optical element 104 may be shaped to be spherically concave (e.g., a portion of a sphere), spherically convex, planar, a rotationally symmetric sphere, a freeform shape, or some other shape that mitigates one or more optical aberrations, such as field curvature. In some embodiments, the shape of one or more surfaces of front optical element 104 and back optical element 106 may be designed to additionally correct for other forms of optical aberration. In some embodiments, one or more of the optical elements within pancake lens block 102 may have one or more coatings, such as anti-reflective coatings, for example, to reduce ghost images and to enhance contrast in the pancake lens block 102.

Back optical element 106 may include a first compound retarder 130 and a mirrored surface 132 (also referred to as partial reflector herein). In this example, first compound retarder 130 may include QWPs (e.g., three QWPs) that transform the polarization of received light. The first compound retarder 130 may have a compound optic axis oriented at approximately 45 degrees relative to incident linearly polarized light (e.g., from the electronic display 108 and/or from a linear polarizer associated with the electronic display 108) such that first compound retarder 130 converts linearly polarized light into circularly polarized light. As noted, the first compound retarder 130 may include multiple retarders, such as QWPs. In another embodiment, QWPs may be made of birefringent materials such as quartz, organic stretched material sheets, or liquid crystal. In one embodiment, the QWPs may be designed to be optimized such that the dependence of the retardance induced by a given retarder remains close to a quarter of a wave independently of the wavelength and the angle of incidence on the QWP.

In some embodiments, the compound retarders (e.g., first compound retarder 130 and second compound retarder 140, to be discussed below) may include three QWPs. The first two QWPs (with respect to the display side) of the compound retarders may collectively act as a half-wave (HW) retarder of light incident on the third QWP of the compound retarders. In some embodiments, such an arrangement may ensure a match between the center wavelength of the HW retarder and the QWP retarder. In some embodiments, a pancake lens configuration whereby the first two QWPs together act as a HW retarder to the third QWP in each compound retarder may be referred to herein as a HW-compensated QWP. Specifically, the chromatic HW retarder may pre-disperse the state of polarization (SOP) of the incident light, and the third QWP (e.g., chromatic QWP) may subsequently transform the light having a range of wavelengths to a common circular SOP. In another embodiment, the HWs (including two QWPs) of the compound retarder may serve to pre-disperse the polarization state of the light, while the third QWP of each compound retarder may further tune the polarization.

In some embodiments, a given, single chromatic QWP may convert linearly polarized light to circularly polarized light at a pre-determined (e.g., designed) quarter wavelength. For example, such a QWP may be configured to convert predominantly green light from linear polarization to circular polarization. However, the same QWP may not be able to effectively convert predominantly red light from linear polarization to circular polarization while also converting the green light (as the pathlength-difference may be insufficient at longer wavelengths). Further, the same QWP may not be able to effectively convert predominantly blue light from linear polarization to circular polarization (as the pathlength difference may be excessive at shorter wavelengths). Accordingly, with a single QWP, the blue light may be overcompensated (e.g., over-retarded) by the QWP, while the red light may be undercompensated (e.g., under-retarded) by the QWP. In some embodiments, by using a chromatic HW retarder before the QWP in a compound retarder, the HW may have a compound optic axis orientation with respect to the third QWP such that the SOPs of blue light and red light are slightly elliptically polarized with the same orientation and opposite handedness (in terms of polarization state) to serve as input for a chromatic transformation of the third QW retarder.

In some embodiments, the SOP of green light (or a wavelength substantially intermediate between the blue and red wavelengths) may be substantially linear after the HW retarder. The three-layer configuration may transform light at two wavelengths (e.g., blue and red) to a circular SOP, versus a single QWP, which may optimally transform light of a single wavelength. In some embodiments, the optical axes of the compound retarder (e.g., the angles of the QWPs) may determine the wavelength separation between these two wavelengths, and therefore the extent of deviation from circular polarization at intermediate wavelengths between the two wavelengths. Therefore, the compound retarder may be used to convert broadband linearly polarized light (e.g., visible light including red, green, and blue light) to circular polarization, and thus serve as an achromatic compound retarder. In some embodiments, the HW (including two separate QWPs) may have double the magnitude of retardance of the third QWP in each compound retarder.

In another embodiment, mirrored surface 132 (also referred to herein as a partial reflector) may be partially reflective to reflect a portion of the received light. In some embodiments, mirrored surface 132 may be configured to transmit approximately 50% of incident light and reflect approximately 50% of incident light. In some instances this relationship may be substantially preserved over the visible spectrum.

Front optical element 104 may include a second compound retarder 140 and a reflective polarizer 142. The second compound retarder 140 may also include individual retarders such as QWPs (e.g., three QWPs). The reflective polarizer 142 may represent a polarization-sensitive, partially reflective mirror configured to reflect received light of a first linear polarization and transmit received light of a second linear polarization. For example, reflective polarizer 142 may be a wire grid polarizer configured to reflect linearly polarized light with a polarization direction in the x-direction, and pass light that is linearly polarized in the y-direction. The reflective polarizer 142 may further include a stretched multi-layer extruded polymer stack, such as the 3M reflective polarizer product.

Although shown as surfaces of front optical element 104 and back optical element 106 respectively, first compound retarder 130 and second compound retarder 140 may be separate from front optical element 104 and back optical element 106 in some embodiments. For example, first compound retarder 130 may be located between mirrored surface 132 and electronic display 108 (e.g., as a freestanding element in air, laminated on the surface of electronic display 108, etc.) and second compound retarder 140 may also be similarly located anywhere between mirrored surface 132 and reflective polarizer 142. Further, although shown as curved, the individual optical elements that together compose front optical element 104 and back optical element 106 in FIG. 1 may be flat or be a mix of flat and curved elements when separately provided. For example, as separate elements, first compound retarder 130 and second compound retarder 140 could be provided flat while mirrored surface 132 and reflective polarizer 142 are curved, among other variations. In one embodiment, first compound retarder 130 and second compound retarder 140 may have a cylindrical shape.

In some embodiments, the pancake lens block 102 may serve to mitigate optical aberration in an optical system. Field curvature may refer to an optical aberration that causes a flat object to appear sharp only in certain parts of the frame, instead of being uniformly sharp across the frame. More generally, field curvature may result from a focal distance of an optical system not perfectly aligning with all of the points on a focal plane. Pupil swim may refer to an effect caused by changes in the location of a user's eye within an eyebox that result in distortions in the content being presented to the user. Correcting for field curvature may mitigate pupil swim. In some embodiments, the pancake lens may mitigate field curvature in an image that is output to a user's eyes to reduce pupil swim. Additionally, pancake lens block 102 may have a small form factor, may be relatively low weight compared to other optical systems designed to remove field curvature, and/or may be configured to have a wide field of view. The operation of pancake lens block 102 is discussed below with respect to FIG. 2.

Figure 2:
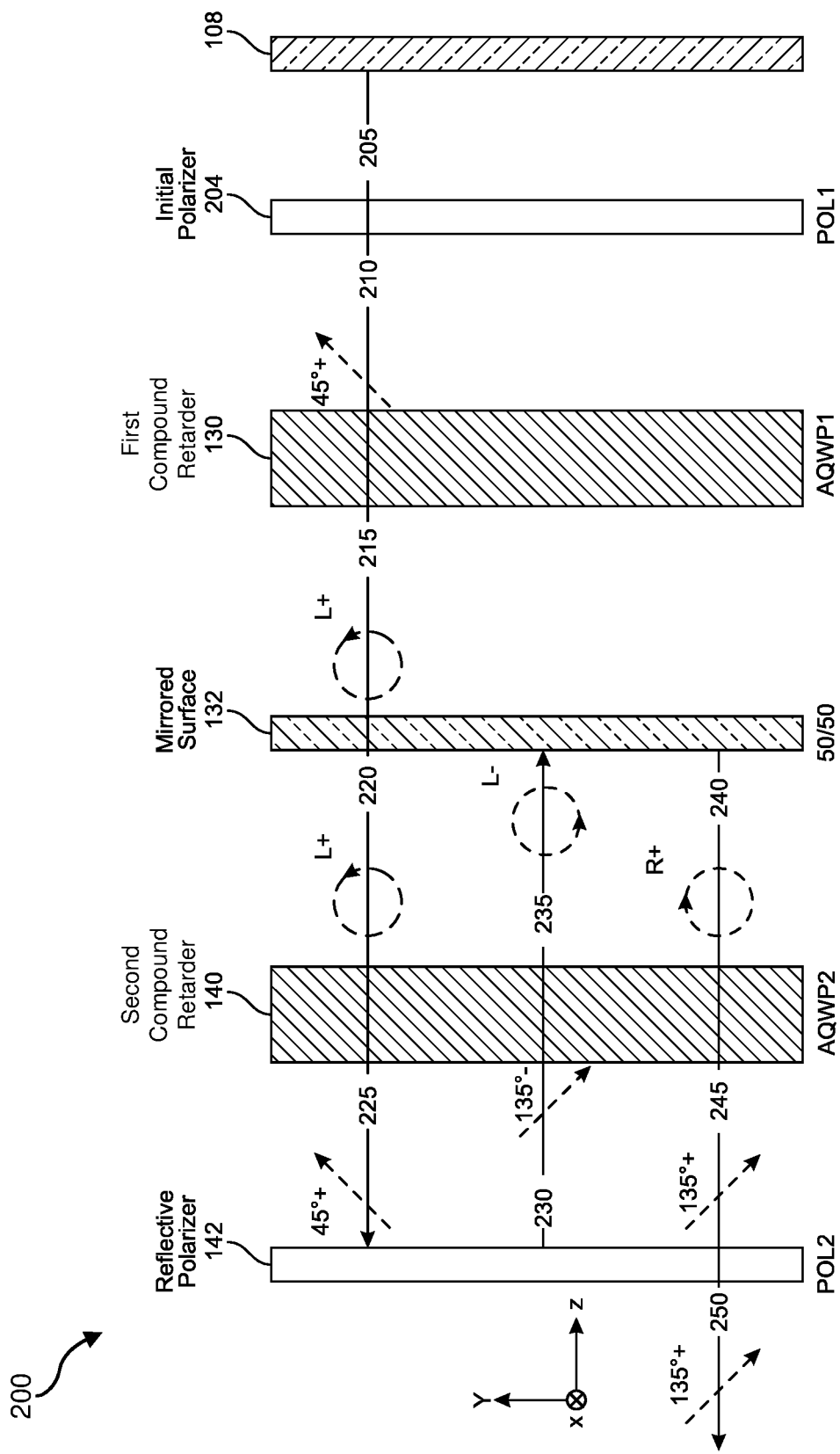
FIG. 2 shows a folded optical path with example polarization states of a pancake lens block, in accordance with one embodiment.

FIG. 2 shows a folded optical path of pancake lens block 102 in accordance with one embodiment. Light 205 from electronic display screen 108 may be initially polarized via initial polarizer 204 (POL1) to linearly polarized light 210. In some embodiments, the light emitted by the display may be already linearly polarized, in which case POL1 may not be needed. First compound retarder 130 may include an achromatic QWP (AQWP1) (e.g., including three QWPs, where the first two QWPs together serve as a HW to the third QWP, as described above) with a compound optical axis that is approximately 45 degrees relative to the direction of polarization of polarized light 210. The orientation of a compound retarder's optical axis relative to incident linearly polarized light may control the handedness and polarization ellipticity of the transmitted circularly polarized light.

AQWP1 may change the polarization of light 210 from linear polarization to circular polarization for a given center wavelength and a given angle (e.g., normal incidence), which is shown as light 215. The polarization of light 215 may be clockwise or anti-clockwise based on the orientation of the axis of AQWP1 relative to incident linearly polarized light 210.

A first portion of light 215 may be reflected by mirrored surface 132 (also referred to as a partial reflector herein), and a second portion of light 215 may be transmitted by mirrored surface 132 as light 220 towards second compound retarder 140. In some embodiments, mirrored surface 132 may be configured to reflect approximately 50% of incident light (e.g., the light 215). Second compound retarder 140 may include an achromatic QWP (AQWP2) (e.g., also including three QWPs, where the first two QWPs together serve as a HW to the third QWP, as described above) and may change the polarization of light 220 from circular to linear (with light passing through AQWP2 referred to as light 225). In this arrangement, light first encounters a QW, then the HW per the "reverse order" architecture to restore the SOP. Light 225 may be incident on reflective polarizer 142 (POL2), which reflects light that is polarized in a blocking/reflecting direction (e.g., an x direction) and transmits light that is polarized in a perpendicular direction (e.g., a y direction). At this point, light 225 may be linearly polarized in the blocking direction. Thus, POL2 may reflect incident light 225 and the reflected light may be referred to as light 230. Accordingly, light 230 is again incident on AQWP2, which changes the linearly polarized light 230 to circularly polarized light 235. Further, mirrored surface 132 may reflect a portion of the polarized light 235, as described above. The reflected portion of light 235 may be referred to as light 240.

Light 240 may also be circularly polarized; however, the handedness of light 240 may be opposite to the handedness of light 235 and light 220 due to the reflection from mirrored surface 132. Thus, AQWP2 may change the polarization of circularly polarized light 240 to linearly polarized light 245. However, as the handedness of light 240 may be opposite to that of light 220, the polarization of light 245 exiting AQWP2 may be perpendicular to that of light 225. Accordingly, light 245 may be linearly polarized in a direction (e.g., y) perpendicular to the blocking direction (e.g., x) of POL2 and may therefore be transmitted by POL2 as light 250.

The process described above, however, may undergo various transformations resulting from imperfections in one or more optical elements. There may, for example, be other light paths in pancake lens block 102 due to imperfections in pancake lens block 102, and these imperfections may cause light leakage, ghost images, and the like. In particular, the wavelength of light may vary (e.g., over the visible spectrum), and a retardance of single QWPs may be a function of wavelength (and may vary with wavelength). Accordingly, a conventional (non-achromatic) QWP (e.g., not the compound retarders disclosed herein) may not be able to provide a quarter-wave retardance over the range of wavelengths of light falling incident thereon.

For example, if AQWP1 were not achromatic (e.g., referred to as QWP1), and were to produce elliptically polarized light instead of circularly polarized light, QWP2 (a non-achromatic version of AQWP2) would transmit elliptically polarized light instead of linearly polarized light. Accordingly, if the SOP of the elliptically polarized light is not restored to the input linear state, at least some light 225 may leak through POL2 in the first see-through path (and lead to artifacts called see-through ghosts) rather than reflect from POL2, as described above. Any leakage of light may be a problem, for example, when using a broadband light source, such as a color display with common chromatic QWPs (e.g., a quarter-wave plate providing quarter-wave retardance for light propagating in a specific direction at a specific wavelength). When light with a wavelength outside of the designed wavelength (and/or outside of the designed incident angle) propagates through a chromatic QWP, the polarization of the output light may be altered from the designed polarization state(s) shown in FIG. 2. Accordingly, the restoration of the input polarization of linear light may be accomplished with any combination of retarder stacks that restores the input SOP (i.e., ROC), so in such an architecture, there may not be a polarization requirement at the mid-point of the optical system.

Figure 3A:
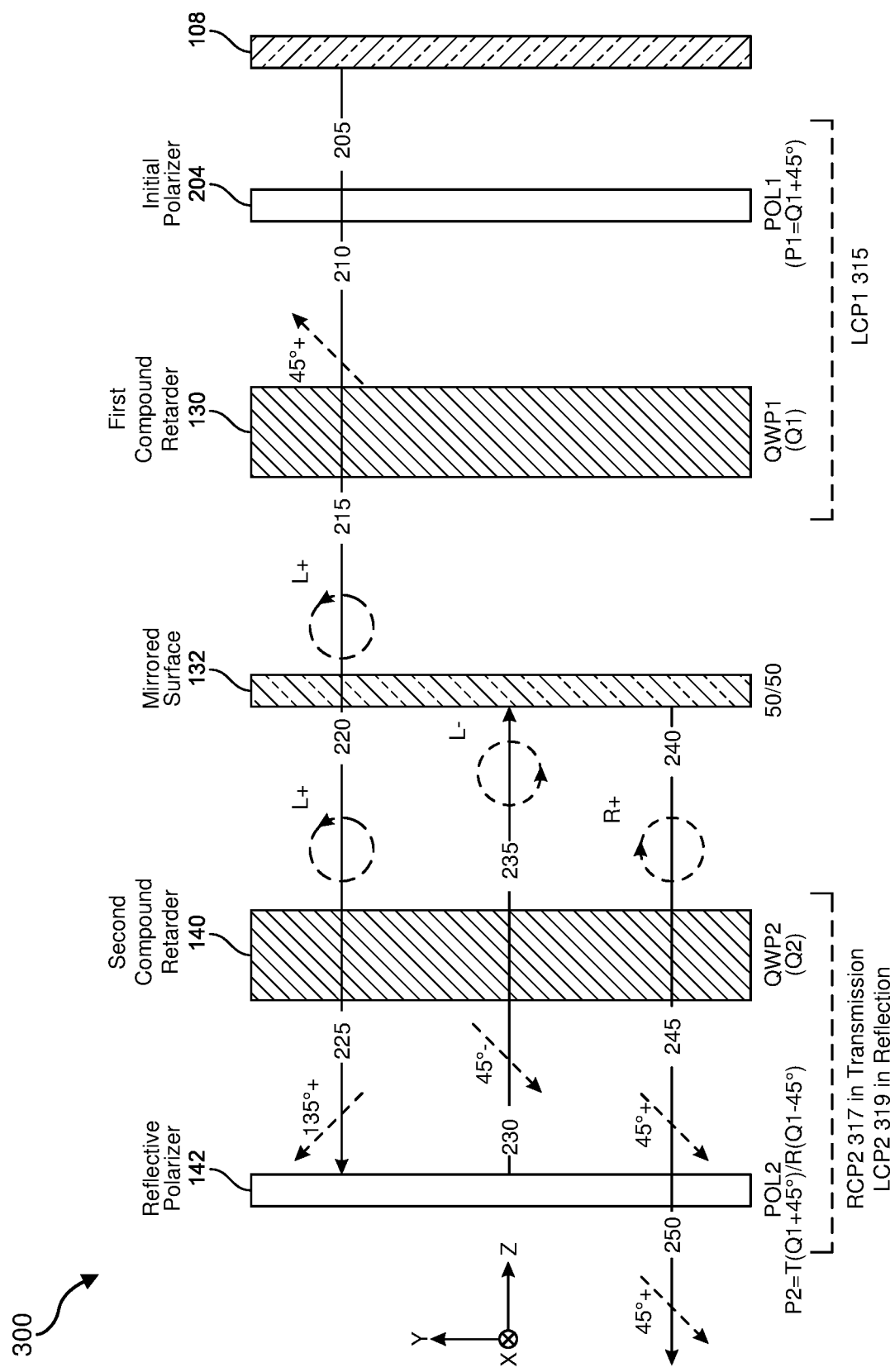
FIG. 3A shows an exemplary pancake lens block with polarizing elements that have no orientation specification between the display polarizing components and the pancake lens block polarizing components, in accordance with one embodiment.

FIG. 3A shows a pancake lens block with polarizing elements that have no orientation specification between the display polarizing components and the pancake lens block polarizing components, in accordance with one embodiment. In particular, FIG. 3A shows a pancake lens block 300 where no specific requirement has been imposed on the relative orientation between the optical element combination including a QWP2 (including a single QWP, which is not achromatic, and part of the second compound retarder 140) and a POL2 (part of reflective polarizer 142), and the optical element combination including a QWP1 (including a single QWP, which is not achromatic, and part of first compound retarder 130) and a POL1 (part of initial polarizer 204). Accordingly, POL1 and QWP1 together effectively operate as a left circular polarizer (LCP1) 315 passing left circularly polarized light. Further, QWP2 and POL2 together effectively operate as a right circular polarizer (RCP2) 317 passing right circularly polarized light in transmission and as a left circular polarizer (LCP2) 319 passing left circularly polarized light in reflection. Accordingly, the polarized light between QWP1 and QWP2 may be circularly polarized. The configuration 300 shown in FIG. 3A may work for any value of Q2, as long as P1 is ±45 degrees relative to Q1 and P2 is ±45 degrees relative to Q2, where P1, P2, Q1, and Q2 denote the optical axis values of POL1, POL2, QWP1, and QWP2, respectively. Here, QWP1 may produce circularly polarized light for a specific wavelength at a specific incidence angle.

FIG. 3B shows an exemplary pancake lens block configuration 301 (aligned to produce the most polarization leakage with wavelength and ray angle) that blocks light during a first see-through path at the designed wavelength (so both compound retarders act as quarter-waveplates), in accordance with one embodiment. As noted, QWP1 may produce circularly polarized light for a specific wavelength at a specific incidence angle. In general, as shown FIG. 3B, this circularly polarized light may be blocked 143 by QWP2 and POL2 optical element combination, regardless of the orientation of Q2, as long as Q2 is orientated 45 degrees relative to P2.

FIG. 3C shows an exemplary pancake lens block configuration 303 (aligned to produce the most polarization leakage with wavelength and ray angle) that leaks light during a first see-through path for light of non-designated wavelengths (so both compound retarders do not act as quarter-waveplates), in accordance with one embodiment. Accordingly, as illustrated in FIG. 3C, since the QWP1 and QWP2 do not provide a quarter-wave retardance for other wavelengths and/or other incidence angles, light with a different wavelength and/or a different incidence angle may leak through 144. For example, as shown in FIG. 3C, QWP2 may transmit elliptically polarized light instead of linearly polarized light, a portion of which may be leaked by 142.

Accordingly, one way to reduce leakage is by fixing the relative orientation between the compound optical axis values Q1 and Q2. Rather than aligning QWP1 with QWP2, which effectively results in a half-wave plate that rotates 45 degrees linearly polarized incident light to 135 degrees linearly polarized light, as shown in FIG. 3A, QWP2 may have an optical axis that is oriented orthogonal to QWP1, as shown in FIG. 4.

Figure 4:
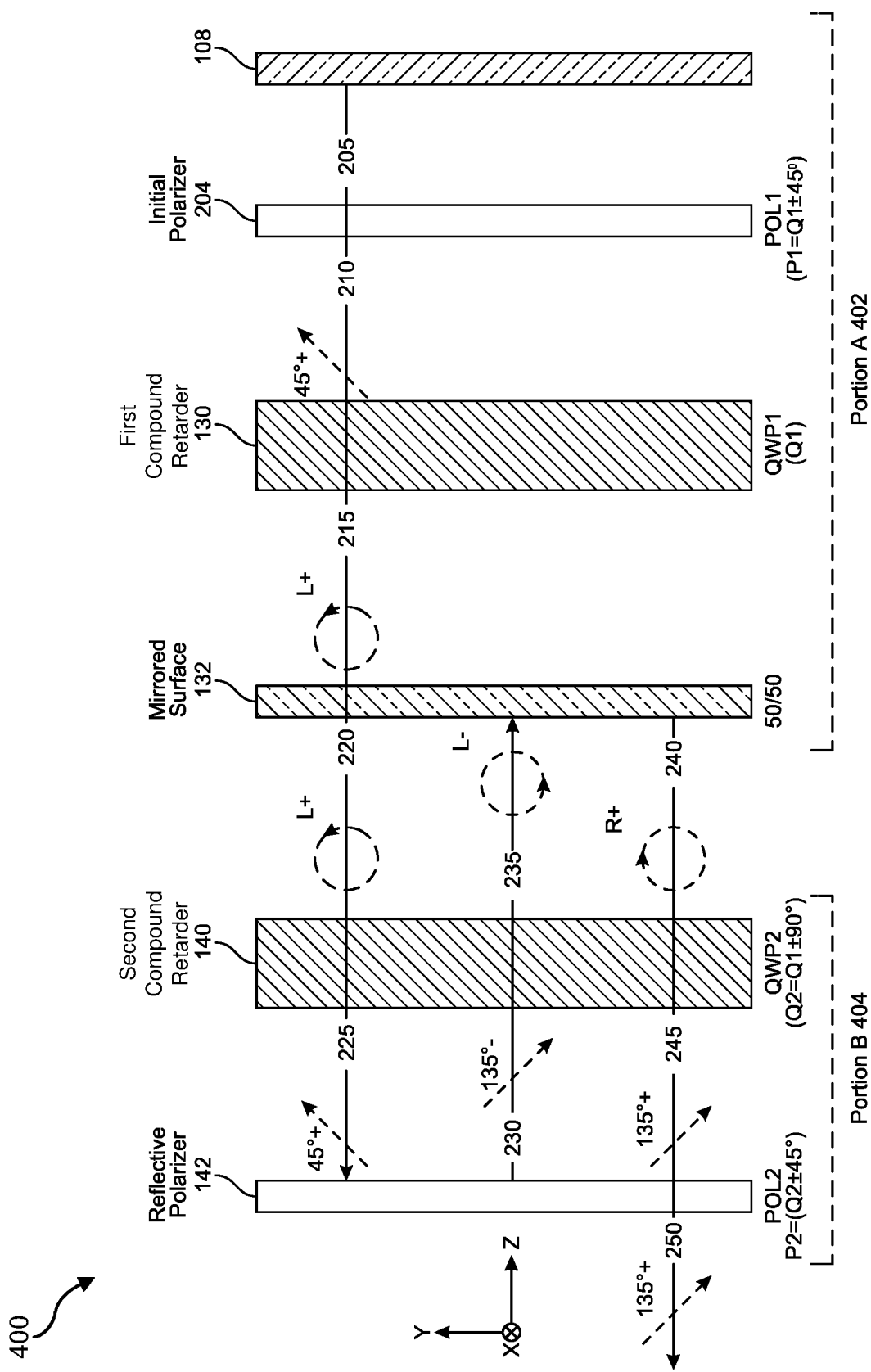
FIG. 4 shows an exemplary pancake lens block with polarizing elements that have an orthogonal orientation relative to each other, in accordance with one embodiment.

FIG. 4 shows an exemplary pancake lens block with polarizing elements that have an orthogonal orientation relative to each other, in accordance with one embodiment. In particular, diagram 400 shows a portion A 402 of the pancake lens block including POL1, QWP1, and mirrored surface 132 (which may be a partial reflector). Further, diagram 400 shows a portion B 404 of the pancake lens block including QWP2 and POL2. In this configuration, QWP2 of portion B 404 may undo the retardance induced by QWP1 of portion A 402 and, thereby, return the 45 degrees linearly polarized incident light on QWP1 back to 45 degrees linearly polarized light for a broadband spectrum of wavelengths. This fixed linearly polarized light at 45 degrees may then be reflected by POL2, and the light leakage may be substantially reduced for a broad spectrum of wavelengths. More precisely, LCP1 315 and RCP2 317 (shown and described in connection with FIG. 3A, above) may be "crossed" (e.g., have optical axes values that are different by 90 degrees, that is orthogonal to one another) in transmission for a broad range of wavelengths (e.g., wavelengths spanning the visible range).

A further explanation for the crossed configuration of the LCP1 315 and RCP2 317 (shown and described in connection with FIG. 3A, above) may be described with reference to FIG. 5 and FIG. 6. In particular, a given compound retarder (i.e., QWP1 or QWP, shown and described in connection with FIG. 3A) may be represented by a vector including two optical properties: a retardance magnitude (e.g., a quarter-wavelength, in this example) and an optical axis orientation (e.g., angle).

Figure 5:
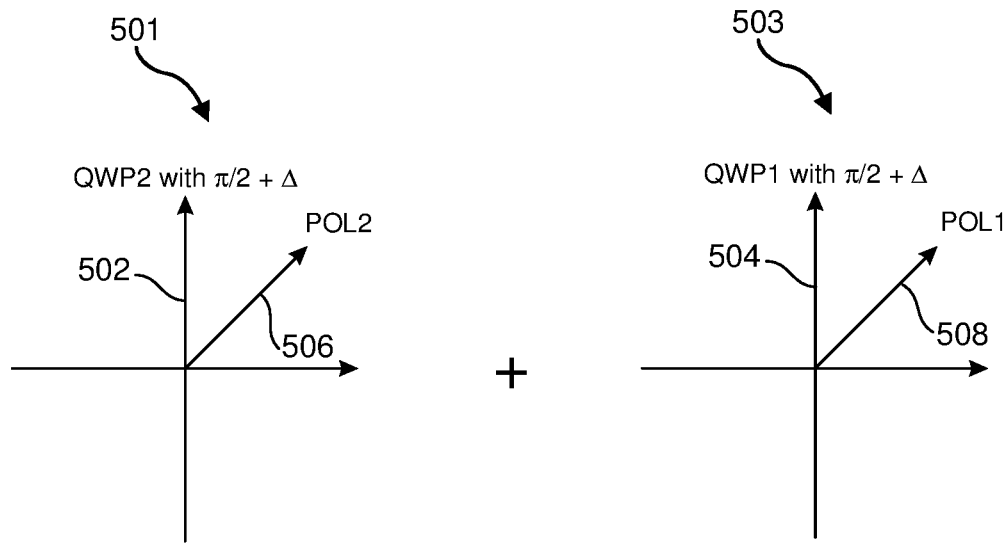
FIG. 5 shows the polarization orientation of an exemplary pancake lens block with polarizing elements that have an orientation specification that produces polarization leakage with wavelength and ray angle, in accordance with one embodiment.

FIG. 5 shows the polarization orientation of a pancake lens block with polarizing elements that have an orientation specification that produces the most polarization leakage with wavelength and ray angle, in accordance with one embodiment. As shown in FIG. 5, if the optical axis 502 of QWP2 as represented by diagram 501 is parallel to the optical axis 504 of QWP1 as represented by diagram 503, the retardance of the QWPs may be effectively additive (e.g., the polarization vector 506 for QWP2 and the polarization vector 508 for QWP1 are additive), and a spectral dispersion effect on light propagating through the QWPs increases. The light leakage of such imperfect QWPs in pancake lens block 102 may thus be proportional to $\cos^2(\pi/2+\Delta)$, where $\pi/2$ is included to capture the retardance magnitude of the quarter-wave and $\Delta$ is a retardance error of QWP1 and QWP2. For example, a 15 degrees retardance error for $\Delta$ may result in a light leakage of approximately 6.7% through the pancake lens block 102 (see FIG. 1), for example, which may degrade image contrast and lead to the formation of ghost images in optical systems using the pancake lens block.

Figure 6:
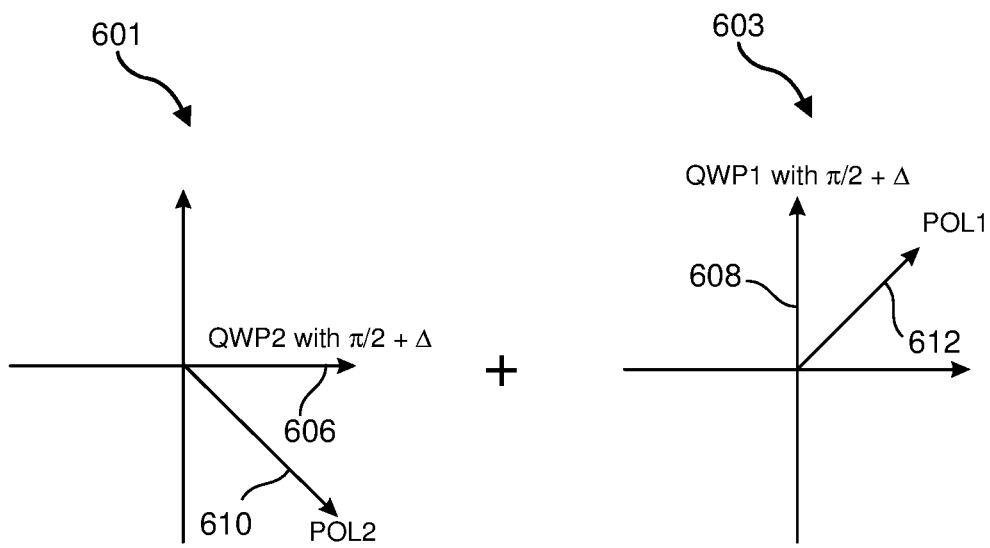
FIG. 6 shows the polarization orientation of an exemplary pancake lens block with polarizing elements that have an orthogonal orientation relative to each other that produces the polarization leakage with wavelength and ray angle, in accordance with one embodiment.

FIG. 6 shows the polarization orientation of a pancake lens block with polarizing elements that have an orthogonal orientation relative to each other that produces the least polarization leakage with wavelength and ray angle, in accordance with one embodiment. Referring to FIG. 6, if the optical axis 606 for QWP2 as represented by diagram 601 is set orthogonal to the optical axis 608 of QWP1 as represented by diagram 603, the vectors representing the magnitudes of the retardance and the optical axes of the compound retarders may subtract (e.g., the polarization vector 610 for QWP2 and the polarization vector 612 for QWP1 are subtractive), and a spectral dispersion effect on light propagating through the QWPs may decrease. The subtraction of the vectors may effectively cancel the retardance error A of both QWP1 and QWP2. Thus, the optical aberrations of the combined QWPs in this arrangement may effectively be zeroed out. Accordingly, the transmitted linearly polarized light from QWP2 (e.g., light 250 shown in connection with FIG. 3A and described in connection with FIG. 2) may be the same as the linearly polarized light incident on QWP1 (e.g., light 210 shown in connection with FIG. 3A and described in connection with FIG. 2). Moreover, since the transmission axis of POL2 is orthogonal to POL1, the transmitted linearly polarized light from QWP2 may not transmit through POL2.

In various aspects, when light travels from one medium to another medium (e.g., between air and an optical element), the light may be refracted, transmitted, and/or reflected. For example, when light travels from one medium, such as air, and another medium, such as a material of a compound retarder (e.g., second compound retarder 140 of FIG. 1) or a reflective polarizer (e.g., reflective polarizer 142 as shown and described in connection with FIG. 1), the light may be refracted, transmitted, and/or reflected (e.g., via Fresnel reflections) at the interface between the media. In an embodiment, the degree of refraction or reflection may be influenced by the refractive index of the media through which the light travels. For example, air may have a refractive index of about 1.0, and a polymer or resin, which may form part of an optical element, may have a refractive index of about 1.5. In an embodiment, an index gradient structure may include a moth-eye structure (e.g., a type of anti-reflective coating) and may be coupled to a surface of one or more of the optical elements described herein, for example, to reduce the reflection at the interface between media having different refractive indices.

In an embodiment, the index gradient structure may include nanostructured features (e.g., nanosized projection and recess unit structures) on a surface of the index gradient structure. Moreover, the index gradient structure may have nanostructured features having a predetermined shape (e.g., a substantially conical shape with a gradually decreasing width toward the top, pyramidal shape, and the like). Accordingly, the refractive index of the index gradient structure may gradually, continuously increase from about 1.0 (refractive index of air) on one side of the index gradient structure (e.g., the side with the nanostructured features) to a higher refractive index of the bulk of the index gradient material (in the case of a polymer or resin, about 1.5). In another aspect, the amount of light reflection at an interface between the media may depend on the difference in the refractive indexes between the media (e.g., air, index gradient structure, and optical element) through which the light propagates. Moreover, by reducing the effect of the refractive interface of light as described above, almost all the light rays may pass through the index gradient structure, decreasing the reflectance on the surface of the index gradient structure and an underlying substrate (e.g., optical element).

Figure 7:
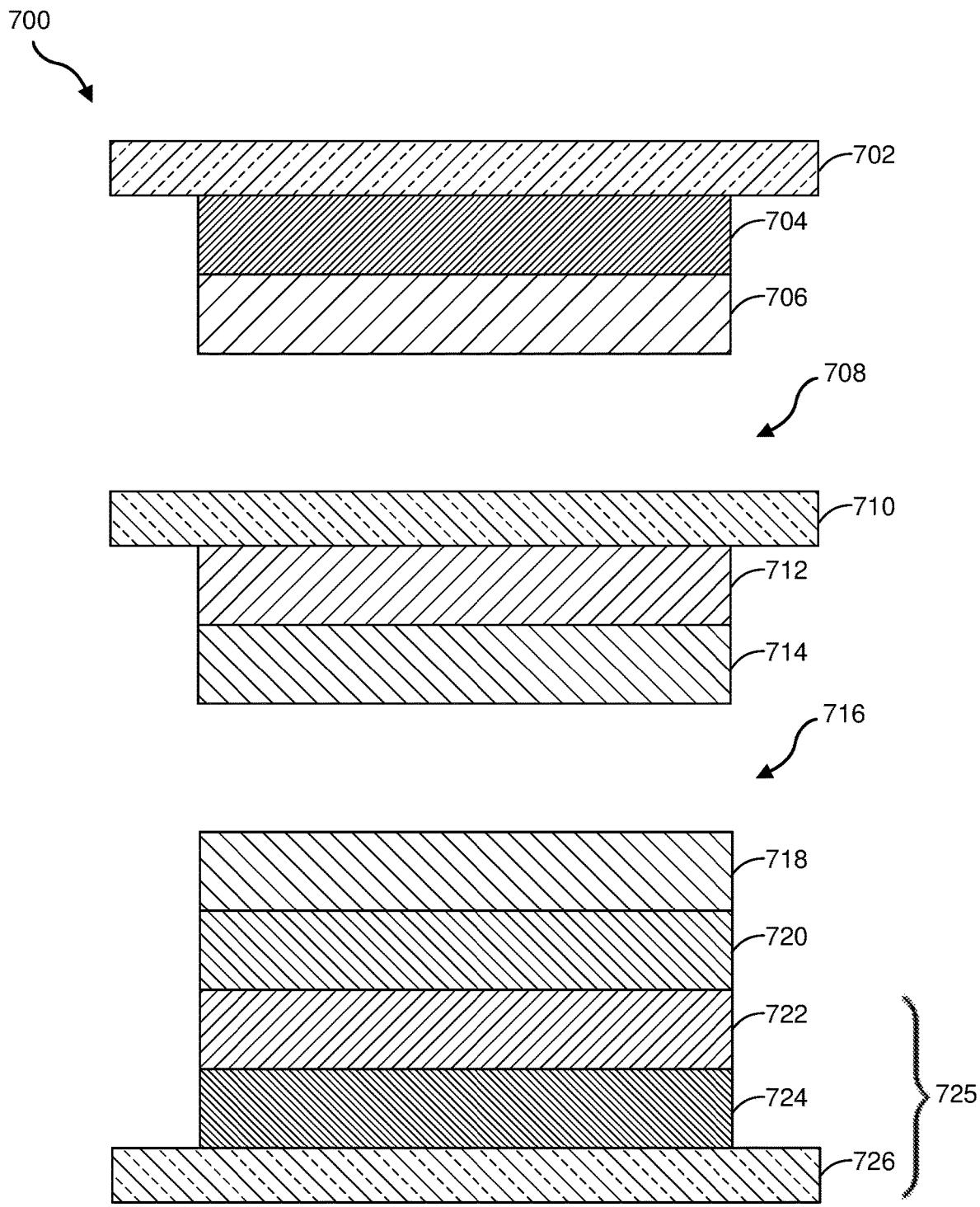
FIG. 7 shows a diagram of an example optical layout of a pancake lens block including index gradient (e.g., moth-eye) structures, in accordance with one embodiment.

FIG. 7 shows a diagram of an example optical layout of an ROC optical system including index gradient structures, in accordance with one embodiment. In various aspects, an ROC pancake lens architecture 700 may be coupled to a display 702 (optional), and may include a first polarizer 704 (e.g., linear polarizer), a first compound retarder 706, a first distance 708 defining a cavity, a partial reflector 710, a second compound retarder 712, a first index gradient structure 714 (also referred to as a first moth-eye structure herein), a second distance 716 defining a cavity, a second index gradient structure 718 (also referred to as a second moth-eye structure herein), and a reflective (e.g., beam-splitting) polarizer 720. The ROC pancake lens architecture 700 structure may optionally include a second polarizer 722, a third compound retarder 724, and an antireflective lens or material 726 that together form an eye-reflection reduction portion 725 that serves to reduce the effect of reflections from the eye of a user back into the visual field of the user.

In some aspects, introducing a distance (e.g., second distance 716) defining a gap (e.g., an airgap or a gap filled with a material such as a nanovoided material) between the second compound retarder 712 and the reflective polarizer 720 in an ROC pancake lens 700 may extend the light's folded path length in the ROC pancake lens 700 without adding significant additional weight to the ROC pancake lens 700. However, the introduction of such a distance defining a cavity or gap without the simultaneous introduction of index-gradient structures (e.g., first and second index gradient structures 714 and 718) may also create Fresnel reflections as described above, for example, between the second compound retarder 714 and the reflective polarizer 720. Accordingly, such Fresnel reflections may lead to visual artifacts (e.g., double/triple bounce ghost images, where light traverses through the second compound retarder in a double pass and leaks through the output of the pancake lens block and the eye of a user) that may be distracting to a user that views the output of the ROC pancake lens 700. In some embodiments, the index gradient (e.g., moth-eye) structures (e.g., first and second index gradient structures 714 and 718) described herein may be used in connection with the gap (e.g., defined by distance 716) to reduce the presence of such undesirable artifacts (e.g., double/triple bounce ghost images) in the ROC pancake lens 700 resulting from such Fresnel reflections (e.g., between the second compound retarder 712 and the reflective polarizer 720). As noted, this may enable light-weight optical designs (e.g., optical designs using cavities or gaps that include airgaps or that are filled with materials such as nanovoided materials) for use in head-mounted displays. Moreover, since the index gradient structures are protected from the external environment by being located within an optical cavity (e.g., a cavity 716 between the second compound retarder 712 and the reflective polarizer 720), the fragility and contamination of the index gradient structures may not be a design concern in such an ROC pancake lens 700 architecture.

In some embodiments, the index gradient structures (e.g., first and second index gradient structures 714 and 718) may be formed by providing a material having an arrangement of nanostructures (e.g., nanosized projections and recess patterns) on one surface of the material. Moreover, the index gradient structures may be coupled onto a surface of a target material for anti-reflection treatment (e.g., a compound retarder surface such as a surface of the second compound retarder 712 or a reflective polarizer surface such as a surface of reflective polarizer 720). In one aspect, the nanostructures may include patterns of projections arranged at intervals approximately equal to or smaller than a wavelength of incident radiation (e.g., having a center wavelength or a shortest wavelength associated with incident visible light). An index gradient structure with nanosized features in such an arrangement may provide pseudo-continuous changes in the refractive index in the interface between one side of the interface (e.g., a side corresponding to air in an airgap or nanovoided material in a gap or cavity 716) and the surface of an optical element on which it is formed (e.g., a surface of the second compound retarder 712 or reflective polarizer 720), so as to transmit almost all incident light regardless of the difference in the refractive index between the media at such an interface.

In another aspect, while the index gradient structure is described as being placed on a surface of a compound retarder or reflective polarizer, it is understood that such an index gradient structures may be placed on other elements of an ROC pancake lens architecture (e.g., one or more of a first compound retarder, partial reflector, or linear polarizer). Moreover, it is to be understood that such index gradient (e.g., moth-eye) structures may be placed on any suitable optical material substrate, the substrate including materials such as glass materials, plastics, and/or metals, which may be translucent. Moreover, the form factor for the substrate may be any form such flat, convex, concave, and/or irregular (e.g., as formed by a melt-molded product, an injection-molded product, a press-molded product, and/or the like). In some instances, index gradient structures may be manufactured on planar substrates and subsequently formed into compound curved antireflection surfaces using any suitable technique, such as thermoforming.

In some aspects, the index gradient structures (e.g., first and second index gradient structures 714 and 718) may have an additional advantage over physical vapor deposition (PVD) multi-layer anti-reflective (AR) coatings in that such index gradient structures may have a reflectivity that is relatively neutral with respect to the wavelength of incident light and the reflectivity may remain relatively low at relatively large angles of incidence. In another aspect, the reflectivity (R) may be less than or equal to approximately 0.4% for incident light having normal incidence to an angle of approximately 30 degrees with respect to normal over a wavelength range of approximately 430 nm to approximately 660 nm.

As noted, in some aspects, the index gradient structures (e.g., first and second index gradient structures 714 and 718) may include patterns (e.g., protrusions and recess patterns) continuously formed on at least a portion of the surface of either the second compound retarder 712 or the reflective polarizer 720. These patterns may include protrusions arranged at intervals equal to or smaller than the wavelength of incident radiation (e.g., visible light). In some embodiments, the protrusions may include conical shaped nanostructures, frustoconical shaped nanostructures, pyramid shaped nanostructures, trapezoidal shaped nanostructures, and/or truncated pyramid shaped nanostructures, where each nanostructure individually has a height of about 10 nm to about 1000 nm.

In some embodiments, the index gradient structures (e.g., first and second index gradient structures 714 and 718) may include individual nanostructures having a height of about 10 nm to about 1000 nm, about 15 nm to about 750 nm, about 20 nm to about 500 nm, about 30 nm to about 300 nm, and/or any individual height or range encompassed by these example ranges. In some embodiments the nanostructures may be conically and/or frustoconically shaped, and a circumferential base may have a radius of from about 10 nm to about 500 nm, about 25 nm to about 400 nm, about 50 nm to about 300 nm, or any individual radius or range encompassed by these example ranges. In other embodiments the nanostructures may be pyramidally shaped and/or trapezoidally shaped (e.g., having one or more trapezoidally shaped surfaces and/or a trapezoidally shaped cross-sectional profile) having a square or a triangular base; further, the sides of the square or triangular base may be from about 10 nm to about 1000 nm, about 25 nm to about 750 nm, about 50 nm to about 500 nm, about 75 nm to about 400 nm, or any individual length or range encompassed by these example ranges.

In some embodiments, the index gradient structures (e.g., first and second index gradient structures 714 and 718) may include randomly arranged nanostructures. In certain embodiments, the index gradient structures may include nanostructures that are arranged in a repeating pattern, for example, parallel rows, alternating rows, concentric squares, circular patterns, swirl patterns, and/or concentric circles. In some embodiments, an integer number (e.g., two or more, three or more, etc.) of such patterns may be included in separate portions of the index gradient structures, and in other embodiments, such patterns may be applied on top of one another. In still other embodiments, portions of the index gradient structures may be patterned in one design and other portions of the index gradient structures may be patterned in another design. Whether the nanostructures are randomly arranged, patterned, or combinations thereof, the nanostructures may be spaced from one another by a predetermined distance (e.g., a distance of about 10 nm to about 800 nm) as measured from the geometric center of an individual nanostructure to the geometric center of a neighboring nanostructure. As such, the index gradient structures of various embodiments may have a nanostructure pitch or lateral periodicity of about 1 nanostructure every 10 nm to about 500 nm, about 1 nanostructure every 100 nm to about 400 nm, about 1 nanostructure every 150 nm to about 300 nm, or any individual periodicity or range encompassed by these example ranges.

In some embodiments, the index gradient structures (e.g., first and second index gradient structures 714 and 718) may include projections which are arranged such that an interval between the top points of adjacent projections (e.g., the width between adjacent projections in the case of a non-periodical structure) or a pitch between the top points of adjacent projections (e.g., the width between adjacent projections in the case of a periodical structure) is equal to or smaller than the wavelength of incident radiation (e.g., the center wavelength or the shortest wavelength of incident visible light). In another aspect, the width between the top points of adjacent projections in the projection or recess portion may be equal to or smaller than the wavelength of incident radiation (e.g., the center wavelength or the shortest wavelength of incident visible light). Accordingly, the index gradient structures may have, on their surface, multiple projections arranged at an interval or a pitch equal to or smaller than the visible light wavelength (e.g., approximately 380 nm). In some embodiments, the index gradient structure may have any suitable thickness, including thicknesses of approximately 5 to approximately 15 µm.

In another aspect, the shape of the nanostructures may also impact the anti-reflective properties of the index gradient structures described above. For example, the truncation of the nanostructures (e.g., the truncation of conically or pyramidally shaped nanostructures) may cause a reduction in the anti-reflective properties of the index gradient structures described above. Therefore, in some embodiments, less than approximately 20%, less than approximately 15%, less than approximately 10%, or less than approximately 5% of the nanostructures on an index gradient structures may be truncated. In some embodiments, reducing the number of truncated nanostructures on the index gradient structures of embodiments may be accomplished by using suitable materials for molding the index gradient structures, designing nanostructures that are capable of withstanding forces exerted during mold release, incorporating the use of a mold release agent into processes for making the index gradient structures to reduce the likelihood of imperfect stripping of the index gradient structures from a template mold. In some embodiments, the index gradient structures may be provided with a protective film (e.g., a plastic wrap or laminate), which may be removable at the time of use of the product.

In some embodiments, the index gradient structures (e.g., first and second index gradient structures 714 and 718) may include any suitable material. For example, the index gradient structures may include an oxide material (e.g., a tungsten oxide, an iron oxide, an aluminum oxide, or the like). In another aspect, the index gradient structures may be formed from materials include a resin composition containing components curable by active energy rays (e.g. light, electron rays, etc.) having certain properties (e.g., a predetermined wavelength range and/or intensity). In another aspect, such curable components may be patterned to form nanostructures, for example by using a stamp as part of a nano-embossing method (to be described below), and then cured to harden the material and form the index gradient structure. Examples of such curable components include monomers and oligomers polymerizable by active energy rays and/or heat. The resin composition may further contain additives for improving properties including wettability (slippage), rigidity, and abrasion resistance, such as slipping agents (surfactants), anti-abrasion agents, hydrophilic substances, and/or polymerization initiators. Examples of the slipping agents may include hydrocarbon surfactants, silicone surfactants, and/or fluorosurfactants. Specific examples of the fluorosurfactants include surfactants containing a group such as a perfluoroalkyl group and a perfluoroalkenyl group in a molecule.

The monomers and/or oligomers polymerizable by active energy rays may be any suitable monomers and/or oligomers that are polymerizable into polymers by irradiation of active energy rays such as ultraviolet rays, visible energy rays, and infrared rays, in the presence or absence of photopolymerization initiators. These monomers and/or oligomers may be, for example, radically polymerizable, anionically polymerizable, and/or cationically polymerizable. Examples of the monomers and/or oligomers may include monomers and/or oligomers having, in a molecule, a vinyl group, a vinylidene group, an acryloyl group, and/or a methacryloyl group (hereinafter, an acryloyl group and a methacryloyl group together may be referred to as a (meth)acryloyl group, and the same applies to the expressions such as a (meth)acrylic compound and a (meth)acrylate). In particular, monomers and/or oligomers containing a (meth)acryloyl group may be used for enabling a high rate of polymerization by irradiation of the active energy rays. The resin compositions curable by active energy rays may include a nonreactive polymer, and an active energy sol-gel reaction composition.

As noted, the index gradient structures (e.g., first and second index gradient structures 714 and 718) may provide a continuous change in the refractive index at the interface between the gap defined by the second distance 716 (e.g., an airgap or a gap including nanovoided materials) and the surfaces of an optical element in the ROC pancake lens (e.g., the second compound retarder 712 or the reflective polarizer 720). In an embodiment, the introduction of such an index gradient structure on the surface of an optical element in the pancake lens may allow for the transmission of almost all of radiation at the interface between the optical element and the gap, regardless of the refractive indices of the optical element (e.g., the index of refraction of the compound retarder 712 or reflective polarizer 720). This may enable the elimination of Fresnel reflections inside the cavity defined by the second distance 716 of the ROC pancake lens (e.g., a gap between the second compound retarder 712 and the reflect polarizer 720). In an aspect, the index gradient structure may provide an interface with low reflectance (e.g., less than approximately 0.3%). Further, the index gradient structure may reduce Fresnel reflections at the interfaces between optical elements for radiation (e.g., visible light) having low, moderate, and/or high angles of incidence to the interface (e.g., radiation having a normal incidence on the interface between the optical elements up to light having an angle of incidence of at least approximately 40 degrees, or more).

In some embodiments, the index gradient structures (e.g., first and second index gradient structures 714 and 718) may be fabricated (e.g., via nano-embossing) on a surface of the optical elements, such as a surface of the second compound retarder 712 (e.g., on a surface of the QWPs that make up the second compound retarder 712) and/or the reflective polarizer 720. Alternatively or additionally, the index gradient structures may be formed on separate substrates (not shown) and coupled (e.g., laminated) to the optical elements such as the second compound retarder 712 and/or the reflective polarizer 720. Moreover, the surface of the optical elements (e.g., the surface of the compound retarder 712 or the surface of the reflective polarizer 720) on which the index gradient structure is formed or laminated may include any suitable shape (e.g., convex, concave, flat, and/or irregular). In some instances, the index gradient structures may be manufactured on plano-isotropic substrates, laminated to functional elements (e.g. compound retarder 712 or reflective polarizer 720), and subsequently formed into compound curved antireflection coated optical components.

In various aspects, the image contrast provided by an optical system (e.g., a head mounted display) employing an ROC pancake lens may be improved by using the index gradient structures in a gap defined by the second distance 716 (e.g., a distance defining a gap that may be filled with air or another suitable material such as nanovoided materials) between optical elements of the ROC pancake lens (e.g., a second compound retarder 712 and a reflective polarizer 720 of the ROC pancake lens). In particular, such a design in the ROC pancake lens may lead to a reduction of undesirable optical effects (e.g., double/triple bounce ghost image formation) in the ROC pancake lens that may be due to Fresnel reflections. Further, the design may enable and improve a cavity-based (e.g., a polarization based double-pass lens) optical design for lighter weight optical devices such as head mounted displays. Further, ROC pancake lenses incorporating the index-gradient structures may use nano-embossment of the index gradient structures onto one or more optical elements of the ROC pancake lens thereby reducing the need for providing carrier substrates and associated processes (e.g., peel-off processes, handling, etc.) and thereby reducing processing time and complexity for fabricating the ROC pancake lenses.

As noted, the distance defining a cavity or gap (e.g., second distance 716) may include air and/or any other suitable material including a nanovoided material (e.g., a material having a plurality of voids and/or nano-sized voids in the material having a predetermined density of nanovoids that have an associated refractive index that may be tuned. In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided material. The voids and/or nanovoids may be either closed- or open-celled, or a mixture thereof. If they are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may have average diameters between approximately 10 nm to about equal to the thickness of the nanovoided material. In some embodiments, the voids may have average diameters between approximately 10 nm and approximately 1000 nm, such as between approximately 10 and approximately 200 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

In some embodiments, the nanovoided material may be formed from curable materials (to be described below), and a first side of the nanovoided material may be deposited onto a removable substrate material. Moreover, a second, exposed side of the nanovoided material may be laminated onto a surface of a given optical element in the ROC pancake lens (e.g., a surface of the second compound retarder 712 or a surface of the reflective polarizer 720), and the removable substrate material may be removed from the first side of the nanovoided material.

Further, in terms of fabrication of the nanovoided material, a curable material (e.g., a monomer) may be deposited (e.g., vaporized by a vaporizer as part of a deposition system, such as a thermal evaporation system) onto a removable substrate material. In some embodiments, a corresponding monomer initiator may be used for starting a chemical reaction to form the nanovoided material. In some examples, "monomer," as used herein, may refer to a monomer that forms the nanovoided material.

Moreover, the deposited curable material may be cured with a source of radiation (e.g., actinic energy) to form the polymer material. In some embodiments, the source of radiation may, for example, include an energized array of filaments that may generate actinic energy to initiate reaction between the monomer and the monomer initiator to effect polymerization of the monomer. The monomer and monomer initiator may react upon exposure to radiation from a radiation source to form a polymer element. In some examples, "actinic energy," as used herein, may refer to energy capable of breaking covalent bonds in a material. Examples may include electrons, electron beams, x-rays, gamma rays, ultraviolet and visible light at appropriately high energy levels, and ions.

In some embodiments, the deposition of the materials (e.g., monomers, monomers, monomer initiators) may be performed using a deposition process, such as chemical vapor deposition (CVD). CVD may refer to a vacuum deposition method used to produce high-quality, high-performance, solid materials. In CVD, a substrate (e.g., the removable substrate) may be exposed to one or more precursors, which may react and/or decompose on the substrate surface to produce the desired deposition.

Figure 8:
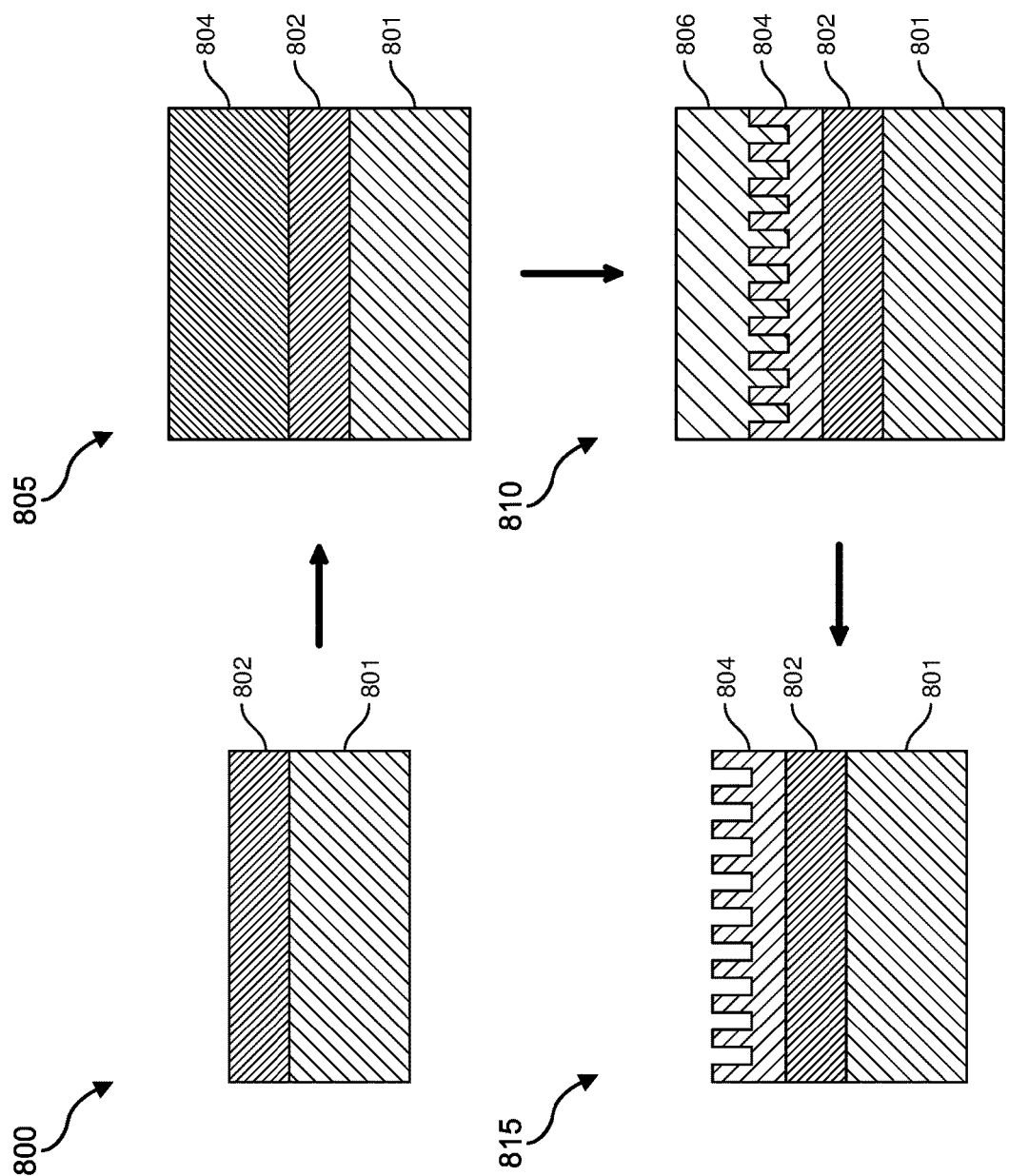
FIG. 8 shows a diagram of example intermediate structures in the fabrication of an index gradient structure, in accordance with example embodiments of the disclosure.

FIG. 8 shows a diagram of example intermediate structures in the fabrication of an index gradient structure, in accordance with example embodiments of the disclosure. In an aspect, the partial structure 800 may include a substrate 801. In an aspect, the substrate 801 may form part of an optical element (e.g., a second compound retarder or a reflective polarizer) associated with the ROC pancake lens. In an aspect, the substrate 801 may include any suitable material, including materials such as glass, plastics, and/or metals, which may be translucent. Moreover, the form factor for the substrate 801 may be any suitable form factor, such as flat, convex, concave, and/or irregular. Moreover, the form factor may be determined by any suitable process for substrate formation (e.g., a melt-molded product, an injection-molded product, a press-molded product, and the like). In an aspect, the substrate 801 may have any suitable thickness, such as, for example, approximately 1 micron thick to approximately 1000 microns thick or greater.

In another aspect, the partial structure 800 may optionally include a buffer material 802. In one aspect, the buffer material 802 may provide planarization or passivation to the substrate 801. In an embodiment, the buffer material 802 may include any suitable material. For example, the buffer material 802 may include a tri-acetyl cellulose (TAC) material, a polyolefin-based resin such as polypropylene, polymethylpentene, and/or a cyclic olefin-based polymer (e.g. norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, and/or acrylic-based resin). In one embodiment, the buffer material 802 may be thicker than the index gradient structure (e.g., the moth-eye structure). In some embodiments, if the buffer material 802 is thin, the laminate including the buffer material 802 and the index gradient structure may be curled due to cure shrinkage of the resin constituting the index gradient structure.

In some embodiments, as shown in FIG. 8, a partial structure 805 (e.g., formed subsequent to partial structure 800) may include an imprintable material 804. In certain embodiments, the imprintable material 804 may include a portion of an optical element (e.g., a compound retarder or a reflective polarizer). In some embodiments, the imprintable material 804 may be attached to a portion of the optical element. Further, the imprintable material 804 be composed of a material that is flexible, and in some embodiments, the flexible material may also be stretchable. Non-limiting examples of such flexible and/or stretchable materials may include flexible and/or stretchable polymers such as silicones, thiolenes, polyurethanes, and/or the like. Other non-limiting examples of the imprintable material 804 may include a tri-acetyl cellulose (TAC) material, a polyolefin-based resin such as polypropylene, polymethylpentene, and/or a cyclic olefin-based polymer (e.g. norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, and/or acrylic-based resin). In some embodiments, the imprintable material 804 may be disposed on curved surfaces such as surfaces of a substrate including a compound retarder or a reflective polarizer. In various embodiments, the imprintable material 804 may be disposed onto the buffer material 802 or the substrate 801 using any suitable method, including, but not limited to, spin-coating, atomic layer deposition (ALD), physical vapor deposition (PVD), chemical vapor deposition (CVD), thermal evaporation, and the like. In some embodiments, the imprintable material 804 may have any suitable thickness, such as, for example, a thickness of approximately 10 nanometers to approximately 10 microns.

In some embodiments, as shown in FIG. 8, a partial structure 810 (e.g., formed subsequent to partial structure 805) may include a molding template 806 (also referred to as an imprinting stamp herein). In some embodiments, the resulting index gradient structure may be produced using the molding template 806 in combination with a stamping device that may include, for example, a press tool, a drum tool, an embossing tool, a molding apparatus, and the like. In one aspect, the molding template 806 may imprint a pattern to the imprintable material 804, for example, to generate an index gradient index gradient structure. In some embodiments, the molding template 806 may be pressed against the imprintable material 804 with a predetermined force or pressure for a predetermined duration. In another aspect, the pattern may include protrusions and recesses that may be included on the molding template 806 to form corresponding imprints continuously on the surface of an optical element (e.g., the second compound retarder or the reflective polarizer). In an embodiment, the molding template 806 may include patterns having protrusions arranged at intervals equal to or smaller than the wavelength of incident radiation (e.g., visible light). In some embodiments, the protrusions may allow the formation of nanostructures in the imprintable material 804, such as conical and/or frustoconical shaped nanostructures, pyramid shaped nanostructures, trapezoidal shaped nanostructures, and/or truncated pyramid shaped nanostructures, where each nanostructure individually has a height of about 10 nm to about 1000 nm.

In some embodiments, the imprintable material 804 may be irradiated or heated to relax the imprintable material 804 so that the pattern may be transferred from the molding template 806 to the imprintable material 804. For example, if the imprintable material 804 includes a polymer, the polymer may be heated up above the glass transition temperature of the polymer while the pattern on the molding template 806 is pressed into the softened polymer material. Further, after being cooled down, the molding template 806 may be separated from the imprintable material 804.

In some embodiments, a photo nanoimprint lithography process may be used to imprint the imprintable material 804 with pattern from a molding template 806. In this case, the imprintable material 804 may include a photo (UV) curable resist, which may be applied or disposed to the substrate 801 or the buffer layer 802. Moreover, the molding template 806 may include transparent material such as fused silica or polydimethylsiloxane (PDMS). The molding template 806 and the substrate 801 and/or the buffer layer 802 may be pressed together, and the UV curable resist may be cured in UV light to become a solid.

In another aspect, the molding template 806 of partial structure 810 may be removed from imprintable material 804 to reveal index gradient structure 815 shown in FIG. 8. In some examples, the removal of the molding template 806 may include removing residual materials, and may include an optional etching process. In one embodiment, the etching process can include, for example, a dry etch. In one embodiment, the dry etch can include, for example, a plasma-based and/or a mechanical-based etch. In one embodiment, the etching process can include, for example, a wet etch. The wet etching process can include, for example, any suitable chemicals for the removal of residual materials.

Figure 9:
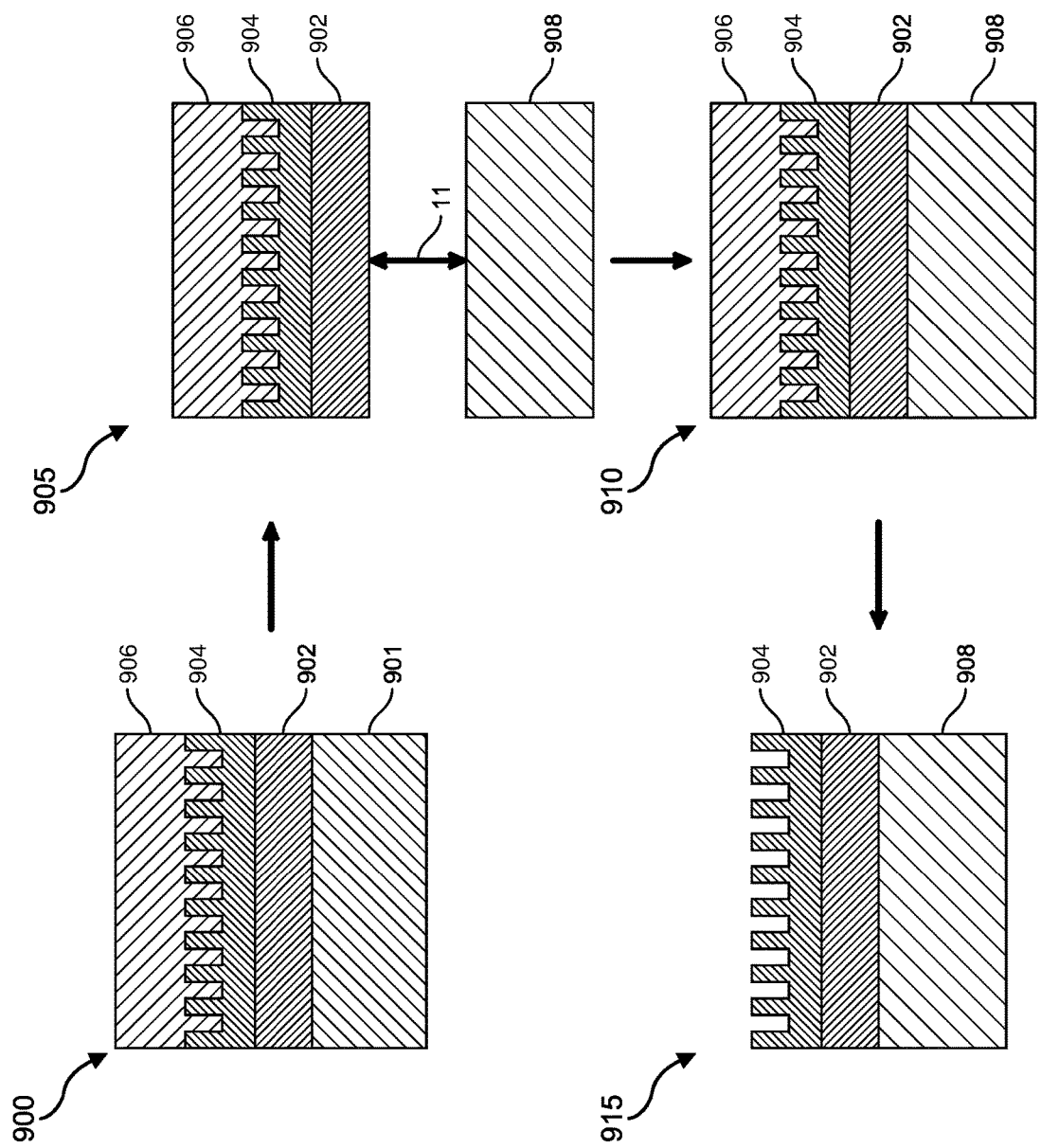
FIG. 9 shows a diagram of an example process of using an index gradient structure, in accordance with example embodiments of the disclosure.

FIG. 9 shows a diagram of an example method of using an index gradient structure, in accordance with example embodiments of the disclosure. In some embodiments, a protected structure 900 may include a first removable material 901 (e.g., a peelable material). In another aspect, the first removable material 901 may include viscoelastic polymers with their rheology tuned to the desired bonding and debonding characteristics needed. In another aspect, the first removable material 901 may include acrylate polymer, rubber (either natural rubber or synthetic thermoplastic elastomer, silicone rubber), and/or the like. In another aspect, these materials may be blended with a tackifier to produce tack (e.g., a term that may refer to the grabbing power of the first removable material 901) at room temperature, may be somewhat deformable, may have low surface energy, and/or may be moisture resistant. Further, the materials may have a low cross-linking density, low viscosity ($\eta<10,000$ cP), and/or may have broad molecular weight distribution to enable deformation of the adhesive material to the rough surface of an underlying substrate under various temperatures and peel conditions.

In one aspect, the protected structure 900 may optionally include a buffer material 902. In one aspect, the buffer material 902 may provide a planarization or passivation to the surface of the optical element that the index gradient structure is ultimately laminated on. In an embodiment, the buffer material 902 may include any suitable material. For example, the buffer material 902 may include a polyolefin-based resin such as polypropylene, polymethylpentene, and/or a cyclic olefin-based polymer (e.g. norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, or acrylic-based resin). In one embodiment, the buffer material 902 may be thicker than the index gradient structure. In some embodiments, if the buffer material 902 is thin, the laminate including the buffer material 902 and the index gradient structure may be curled due to cure shrinkage of the resin constituting the index gradient structure.

In another aspect, the interface between the first removal material 901 and the buffer material 902 may include an adhesive layer (not shown). In one aspect, the adhesive layer may be made of any material. To the face of the adhesive layer opposite to the face where the buffer material 902 is provided, a separator film (e.g. polyethylene terephthalate (PET), not shown) for protection of the adhesive layer may be adhered.

In various embodiments, any suitable adhesive may be used. For example, the adhesive may be a self-assembled monolayer, a pressure sensitive adhesive, a standard reactive adhesive, or the like. Self-assembled monolayer adhesives may use a silane coupling agent including an alkoxysilane and a reactive functional group. The silane coupling unit may covalently react with a glass substrate and the reactive functional group may react with the nanopatterned index gradient structure. Examples of silane coupling agents may include, for example, 3-glycidoxypropyltrimethoxysilane, (2-aminoethyl)aminopropyltriethoxysilane, aminopropyltrimethoxysilane, aminopropyltriethoxysilane, (2-aminoethyl)aminopropylmethyldimethoxysilane, methacyryloxypropylmethyltrimethoxysilane, ethacryryloxypropyltrimethoxysilane, glycidoxypropyltrimethoxysilane, mercaptopropyl trimethoxysilane, vinyltriacetoxysilane, chloropropyltrimethoxysilane, vinyltrimethoxysilane, octadecyldimethyl-[3-(trimethoxysilyl)-propyl]ammonium chloride, mercaptopropyl-methyldimethoxysilane, isocyanatopropyltriethoxysilane, (3-acryloxpropyl)trimethoxy-silane, and the like.

Pressure sensitive adhesives (PSA) may usually be polymeric materials applied between two layers for forming a bond with the desired cohesive strength upon application of a light pressure. A primary mode of bonding for a pressure sensitive adhesive may not be chemical or mechanical, but rather may be a polar attraction of an adhesive to a given material. Pressure sensitive adhesives may be designed with a balance between flow and resistance to flow. The bond may form because the adhesive may be soft enough to flow or wet the substrate. The bond may have strength because the adhesive may be hard enough to resist flow when stress is applied to the bond. Once the adhesive and the substrate are in proximity of each other, additional molecular interactions occur, such as, for example, Van der Waals' forces, capillary forces and the like, or combinations thereof, which may provide a significant contribution to the strength of the bond.

When peeled from a surface (e.g., when removed from the buffer material 902), the adhesive may demonstrate a clean peel, cohesive splitting, delamination and the like, or combinations thereof. The rate of bond formation may be determined by the conditions under which the adhesive contacts a surface and may be controlled by the surface energy of the adhesive, the surface energy of the substrate, and the viscosity of the adhesive. Cohesion is the property of a pressure sensitive adhesive that allows it to resist shear stress. Cohesion may further be a measure of an adhesive's internal bond strength. Good cohesion may be necessary for a clean peel. In an embodiment, the adhesive layer may include a material that has a first index of refraction that is substantially similar to at least one of an index of refraction of an optical element (e.g., a second compound retarder or a reflective polarizer) or an index of refraction of the first index-gradient structure.

In one aspect, the protected structure 900 may include an index gradient structure 904. In some embodiments, the index gradient structure 904 may be formed by providing a material having an arrangement of nanostructures (e.g., nanosized projections and recess patterns) on one surface of the material. In one aspect, the nanostructures may include patterns of projections arranged at intervals approximately equal to or smaller than a wavelength of incident radiation (e.g., having a center wavelength or a shortest wavelength associated with incident visible light). In some embodiments, the protrusions may include conical shaped nanostructures, frustoconical shaped nanostructures, pyramid shaped nanostructures, trapezoidal shaped nanostructures, and/or truncated pyramid shaped nanostructures, where each nanostructure individually has a height of about 10 nm to about 1000 nm.

In some embodiments, the index gradient structure 904 may include individual nanostructures having a height of about 10 nm to about 1000 nm, about 15 nm to about 750 nm, about 20 nm to about 500 nm, about 30 nm to about 300 nm, and/or any individual height or range encompassed by these example ranges. In some embodiments the nanostructures may be conically and/or frustoconically shaped, and a circumferential base may have a radius of from about 10 nm to about 500 nm, about 25 nm to about 400 nm, about 50 nm to about 300 nm, or any individual radius or range encompassed by these example ranges. In other embodiments the nanostructures may be pyramidally shaped, truncated pyramidally shape, and/or trapezoidally shaped having a square or a triangular base; further, the sides of the square or triangular base may be from about 10 nm to about 1000 nm, about 25 nm to about 750 nm, about 50 nm to about 500 nm, about 75 nm to about 400 nm, or any individual length or range encompassed by these example ranges.

In some embodiments, the index gradient structure 904 may include randomly arranged nanostructures. In certain embodiments, the index gradient structures may include nanostructures that are arranged in a repeating pattern, for example, parallel rows, alternating rows, concentric squares, circular patterns, swirl patterns, or concentric circles. In some embodiments, an integer number (e.g., two or more, three or more, etc.) of such patterns may be included in separate portions of the index gradient structures, and in other embodiments, such patterns may be applied on top of one another. In still other embodiments, portions of the index gradient structures may be patterned in one design and other portions of the index gradient structures may be patterned in another design.

In some embodiments, the index gradient structures 900 may include any suitable material. For example, the index gradient structures may include an oxide material (e.g., a tungsten oxide, an iron oxide, an aluminum oxide, or the like). In another aspect, the index gradient structure 900 may be formed from materials that include a resin composition containing components curable by active energy rays (e.g. light, electron rays) having certain properties (e.g., a predetermined wavelength range or intensity). In another aspect, such curable components may be patterned to form nanostructures, for example by using a stamp as a part of a nano-embossing method (to be described below), and then cured to harden the material and form the index gradient structure 900.

In one aspect, the protected structure 900 may include a second removable material 906 (e.g., a peelable material). FIG. 9 shows a diagram of an example method of using an index gradient structure, in accordance with example embodiments of the disclosure. In another aspect, the protected structure 900 may include a second removable material 906 (e.g., a peelable material). In another aspect, the second removable material 906 may include viscoelastic polymers with their rheology tuned to the desired bonding and de-bonding characteristics needed. In another aspect, the second removable material 906 may include acrylate polymer, rubber (either natural rubber or synthetic thermoplastic elastomer, silicone rubber), and/or the like. In another aspect, these materials may be blended with a tackifier to produce tack (e.g., a term that may refer to the grabbing power of the second removable material 906) at room temperature, may be somewhat deformable, may have low surface energy, and/or may be moisture resistant. Further, the materials may have a low cross-linking density, low viscosity ($\eta$<10,000 cP), and/or may have broad molecular weight distribution to enable deformation of the adhesive material to the rough surface of an underlying substrate under various temperatures and peel conditions.

In various aspects, FIG. 9 illustrates aspects of the attachment of the index gradient structure 904 to a substrate 908. In some embodiments, the first removable material 901 may be removed from the protected structure 900, to reveal a surface of the buffer material 902 (or if the buffer material 902 is not included in protected structure 900, a surface of the index gradient structure 904). Thereafter, the surface of the buffer material 902 may be coupled 911 (e.g., laminated, pressure laminated, etc.) onto a surface of the substrate 908, thereby yielding a semi-protected structure 910, as shown in FIG. 9.

In particular, the semi-protected structure 910 may still have a second removable material 906 that may protect the index gradient structure 904. However, the second removable material 906 may be removed (e.g., peeled away) to yield the structure 915 that includes the exposed surface of the index gradient structure 904, as shown in FIG. 9.

Figure 10:
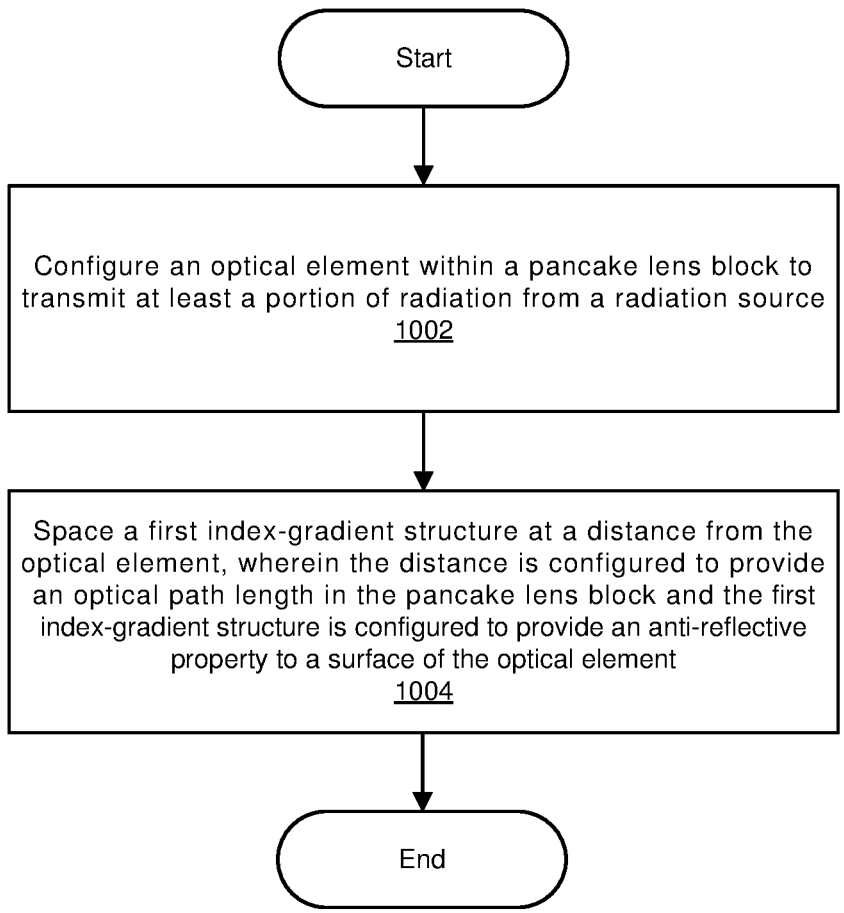
FIG. 10 shows flow diagram of an example method for producing a pancake lens having index gradient structures, in accordance with example embodiments of the disclosure.

FIG. 10 shows a flow diagram of an example method for producing a pancake lens having index gradient structures, in accordance with example embodiments of the disclosure. At step 1002, an optical element may be configured within a pancake lens block to transmit at least a portion of radiation from a radiation source, in accordance with various embodiments disclosed herein. In some embodiments, the optical element may include a compound retarder (e.g., second compound retarder 712 shown and described in connection with FIG. 7, above) and a reflective polarizer (e.g., reflective polarizer 720 also shown and described in connection with FIG. 7, above). In another aspect, the pancake lens block may further include various optical elements that are arranged so as to provide and/or enhance optical performance (e.g., increased contrast, reduced optical artifacts, etc.) in an optical device (e.g., a head-mounted device). In particular, the pancake lens may include, but not be limited to, a display (optional), first linear polarizer, a first compound retarder, a first distance defining a gap, a partial reflector, a second compound retarder, a first index gradient structure, a second index gradient structure, and a reflective (e.g., beam-splitting) polarizer. The pancake lens structure may optionally include a second reflective polarizer, a third compound retarder, and an antireflective lens or material that form an eye-reflection reduction portion that serves to reduce the effect of reflections from the eye of a user back into the visual field of the user.

At step 1004 in FIG. 10, a first index-gradient structure may be spaced at a distance from the optical element, in accordance with various embodiments disclosed herein. The distance may serve to define a gap that may include air or any other suitable material, such as, for example, a nanovoided material (e.g., a material having a plurality of voids and/or nano-sized voids in the material having a predetermined density of nanovoids) that may additionally have an associated refractive index that may be tuned. In some embodiments, the nanovoids may occupy approximately 10% to 90% of the volume of the nanovoided material. The voids and/or nanovoids may be either closed- or open-celled, or a mixture thereof. If the voids and/or nanovoids are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the voids may have average diameters between approximately 10 nm and approximately 1000 nm, such as between approximately 10 and approximately 200 nm.

The distance between the first index-gradient structure and the optical element may be configured to provide an optical path length in the pancake lens block. In another aspect, introducing a distance defining a gap (e.g., an airgap or a gap filled with a material such as a nanovoided material) from the optical element (e.g., from the second compound retarder and/or the reflective polarizer) may extend the light's folded path length in the pancake lens without adding significant additional weight to the pancake lens. However, the introduction of such a distance defining a gap without the simultaneous introduction of index-gradient structures may also create Fresnel reflections.

Accordingly, such Fresnel reflections may lead to visual artifacts (e.g., double/triple bounce ghost images) that may be distracting to a user that views the output of the pancake lens. In some embodiments, the index gradient (e.g., moth-eye) structures described herein may be used in connection with the cavity or gap in order to reduce the presence of such undesirable artifacts (e.g., double/triple bounce ghost images) in the pancake lens resulting from such Fresnel reflections (e.g., between the second compound retarder and the reflective polarizer). As noted, this may enable lightweight optical designs (e.g., optical designs using polarization-based double-pass cavities that include airgaps or that are filled with materials such as nanovoided materials) for use in head-mounted displays.

Additionally, the first index-gradient structure may be configured to provide an anti-reflective property to a surface of the optical element. In some embodiments, the first index gradient structure may be formed by providing a material having an arrangement of nanostructures (e.g., nanosized projections and recess patterns) on one surface of the material. Moreover, the first index gradient structure may be coupled onto a surface of a target material for anti-reflection treatment (e.g., a compound retarder surface such as the second compound retarder or a reflective polarizer surface such as reflective polarizer). In one aspect, the nanostructures may include patterns of projections arranged at intervals approximately equal to or smaller than a wavelength of incident radiation (e.g., having a center wavelength or a shortest wavelength associated with incident visible light). An index gradient structure with nanosized features in such an arrangement may provide pseudo-continuous changes in the refractive index in the interface between one side of the interface (e.g., a side corresponding to air in an airgap or nanovoided material in a gap or cavity) and the surface of an optical element on which it is formed (e.g., a surface of the second compound retarder or reflective polarizer), so as to transmit almost all incident light regardless of the difference in the refractive index between the media at such an interface.

In some embodiments, the first index gradient structure may include individual nanostructures having a height of about 10 nm to about 1000 nm, about 15 nm to about 750 nm, about 20 nm to about 500 nm, about 30 nm to about 300 nm, or any individual height or range encompassed by these example ranges. In some embodiments the nanostructures may be conically shaped, and a circumferential base may have a radius of from about 10 nm to about 500 nm, about 25 nm to about 400 nm, about 50 nm to about 300 nm, or any individual radius or range encompassed by these example ranges. In other embodiments the nanostructures may be pyramidally shaped or trapezoidally shaped having a square or a triangular base; further, the sides of the square or triangular base may be from about 10 nm to about 1000 nm, about 25 nm to about 750 nm, about 50 nm to about 500 nm, about 75 nm to about 400 nm, or any individual length or range encompassed by these example ranges.

Figure 11:
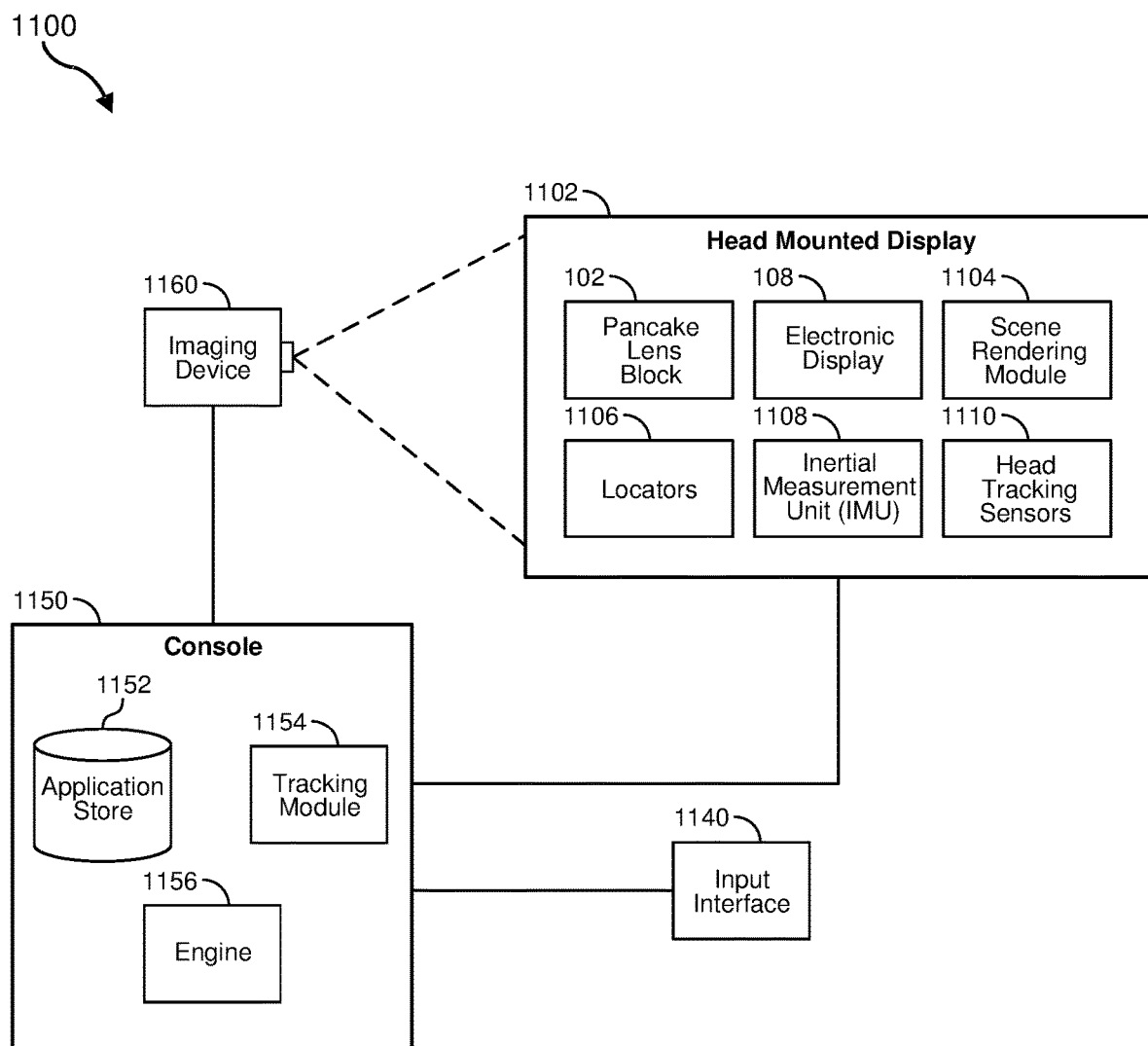
FIG. 11 shows a diagram of an example system environment in which a head-mounted display with a pancake lens operates, in accordance with at least one embodiment.

FIG. 11 is a block diagram of an exemplary system environment 1100 including an HMD 1102 that includes pancake lens block 102. System environment 1100 shown by FIG. 11 includes an HMD 1102, an imaging device 1160, and an input interface 1140 that are each coupled to a console 1150. While FIG. 11 shows an example system 1100 including one HMD 1102, one imaging device 1160, and one input interface 1140, in other embodiments any suitable number of these components may be included in the system 1100. For example, there may be multiple HMDs 1102, each having an associated input interface 1140 and being monitored by one or more imaging devices 1160, with each HMD 1102, input interface 1140, and imaging device 1160 communicating with the console 1150. In alternative configurations, different and/or additional components may be included in the system environment 1100. The system 1100 may operate in a system environment, an augmented reality (AR) system environment, a mixed reality (MR) system environment, or some combination thereof. In some embodiments, at least one of imaging device 1160, console 1150, and/or input interface 1140 may be included within HMD 1102 and/or may be external to HMD 1102.

HMD 1102 may present content to a user. Example content may include images, video, audio, or some combination thereof. Audio content may be presented via a separate device (e.g., speakers and/or headphones) external to HMD 1102 that receives audio information from HMD 1102, console 1150, or both. In some embodiments, HMD 1102 may include pancake lens block 102, an electronic display 108, locators 1106, an internal measurement unit (IMU) 1108, head tracking sensors 1110, and/or a scene rendering module 1104. In some embodiments, the HMD 1102 may present virtual reality (VR) elements, augmented reality (AR) elements, mixed reality (MR) elements, or some combination thereof to a user. In the AR and/or MR embodiments, the HMD 1102 may augment views of a physical, real-world environment with computer-generated elements (e.g., images, video, sound, etc.).

Electronic display screen 108 may present visual information (i.e., image light) from an electronic signal. The electronic display 108 may be, e.g., a liquid crystal display (LCD), an organic light emitting diode (OLED) display, an active-matrix organic light-emitting diode display (AMO-LED), some type of flexible display, some combination thereof, and/or any other suitable type of emissive display. In some embodiments, electronic display screen 108 may include a linear polarizer and/or may admit light that is linearly polarized.

Pancake lens block 102 may direct light from electronic display 108 to an exit pupil for viewing by a user using one or more optical elements in addition to two curved optical elements (e.g., front optical element 104 and back optical element 106 described in reference to FIGS. 1-2). For example, the one or more optical elements may include at least one of apertures, Fresnel lenses, convex lenses, concave lenses, filters, and so forth, and may include combinations of different optical elements. In some embodiments, one or more of the optical elements of pancake lens block 102 may have one or more coatings, such as anti-reflective coatings. Magnification of the image light by pancake lens block 102 may allow electronic display 108 to be physically smaller, weigh less, and consume less power than larger displays. Additionally, magnification of the image light may increase a field of view of the displayed content. For example, the field of view of the displayed content may be such that the displayed content is presented using almost all (e.g., 150 degrees diagonal), and in some cases all, of the user's field of view.

Locators 1106 may represent objects located in specific positions on HMD 1102 relative to one another and relative to a specific reference point on HMD 1102. Locators 1106 may be, for example, a light emitting diode (LED), a corner cube reflector, a reflective marker, a type of light source that contrasts with an environment in which HMD 1102 operates, or some combination thereof. Active locators 1106 (e.g., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 1106 may be located beneath an outer surface of HMD 1102, which is transparent to the wavelengths of light emitted or reflected by locators 1106 or is thin enough to not substantially attenuate the wavelengths of light emitted or reflected by locators 1106. Further, the outer surface or other portions of HMD 1102 may be opaque in the visible band of wavelengths of light. Thus, locators 1106 may emit light in the IR band while under an outer surface of HMD 1102 that is transparent in the IR band but opaque in the visible band.

IMU 1108 may represent an electronic device that generates fast calibration data based on measurement signals received from one or more of head tracking sensors 1110, which generate one or more measurement signals in response to motion of HMD 1102. Examples of head tracking sensors 1110 include accelerometers, gyroscopes, magnetometers, other sensors suitable for detecting motion, correcting error associated with IMU 1108, or some combination thereof. Head tracking sensors 1110 may be located external to IMU 1108, internal to IMU 1108, or some combination thereof.

Based on the measurement signals from head tracking sensors 1110, IMU 1108 may generate fast calibration data indicating an estimated position of HMD 1102 relative to an initial position of HMD 1102. For example, head tracking sensors 1110 may include multiple accelerometers to measure translational motion (forward/back, up/down, left/right) and multiple gyroscopes to measure rotational motion (e.g., pitch, yaw, and roll). IMU 1108 may, for example, rapidly sample the measurement signals and calculate the estimated position of HMD 1102 from the sampled data. For example, IMU 1108 may integrate measurement signals received from the accelerometers over time to estimate a velocity vector and integrate the velocity vector over time to determine an estimated position of a reference point on HMD 1102. The reference point may represent a point that may be used to describe the position of HMD 1102. While the reference point may generally be defined as a point in space, in various embodiments, reference point may be defined as a point within HMD 1102 (e.g., a center of the IMU 1108). Alternatively, IMU 1108 may provide the sampled measurement signals to console 1150, which determines the fast calibration data.

IMU 1108 may additionally receive one or more calibration parameters from console 1150. As further discussed below, the one or more calibration parameters may be used to maintain tracking of HMD 1102. Based on a received calibration parameter, IMU 1108 may adjust one or more IMU parameters (e.g., sample rate). In some embodiments, certain calibration parameters may cause IMU 1108 to update an initial position of the reference point to correspond to a next calibrated position of the reference point. Updating the initial position of the reference point as the next calibrated position of the reference point may help reduce accumulated error associated with determining the estimated position. This accumulated error, also referred to as drift error, may cause the estimated position of the reference point to "drift" away from the actual position of the reference point over time.

Scene rendering module 1104 may receive content for the virtual scene from engine 1156 and provide the content for display on electronic display 108. Additionally, scene rendering module 1104 may adjust the content based on information IMU 1108 and head tracking sensors 1110. For example, upon receiving the content from engine 1156, scene rendering module 1104 may adjust the content based on the predicted state (i.e., eye position and focal length) of pancake lens block 102 received from a focus prediction module. Additionally, scene rendering module 1104 may determine a portion of the content to be displayed on electronic display 108 based on one or more of tracking module 1154, head tracking sensors 1110, or IMU 1108, as described further below.

Imaging device 1160 may generate slow calibration data in accordance with calibration parameters received from console 1150. Slow calibration data may include one or more images showing observed positions of locators 1106 that are detectable by imaging device 1160. Imaging device 1160 may include one or more cameras, one or more video cameras, other devices capable of capturing images including one or more locators 1106, or some combination thereof. Additionally, imaging device 1160 may include one or more filters (e.g., for increasing signal to noise ratio). Imaging device 1160 may be configured to detect light emitted or reflected from locators 1106 in a field of view of imaging device 1160. In embodiments where locators 1106 include passive elements (e.g., a retroreflector), imaging device 1160 may include a light source that illuminates some or all of locators 1106, which retro-reflect the light towards the light source in imaging device 1160. Slow calibration data may be communicated from imaging device 1160 to console 1150, and imaging device 1160 may receive one or more calibration parameters from console 1150 to adjust one or more imaging parameters (e.g., focal length, focus, frame rate, ISO, sensor temperature, shutter speed, aperture, etc.).

Input interface 1140 may represent a device that allows a user to send action requests to console 1150. An action request may represent a request to perform a particular action. For example, an action request may be to start or end an application or to perform a particular action within the application. Input interface 1140 may include one or more input devices. Example input devices include a keyboard, a mouse, a game controller, and/or any other suitable device for receiving action requests and communicating the received action requests to console 1150. An action request received by input interface 1140 may be communicated to console 1150, which performs an action corresponding to the action request. In some embodiments, input interface 1140 may provide haptic feedback to the user in accordance with instructions received from console 1150. For example, haptic feedback may be provided by the input interface 1140 when an action request is received and/or console 1150 communicate instructions to input interface 1140 causing input interface 1140 to generate haptic feedback when console 1150 performs an action.

Console 1150 may provide content to HMD 1102 for presentation to the user in accordance with information received from imaging device 1160, HMD 1102, or input interface 1140. In the example shown in FIG. 11, console 1150 may include an application store 1152, a tracking module 1154, and an engine 1156. Some embodiments of console 1150 may have different or additional modules than those described in conjunction with FIG. 11. Similarly, the functions further described below may be distributed among components of console 1150 in a different manner than is described herein.

Application store 1152 may store one or more applications for execution by console 1150. An application may represent a group of instructions, that when executed by a processor, generates content for presentation to the user. Content generated by an application may be in response to inputs received from the user via movement of HMD 1102 or interface device 1140. Examples of applications include gaming applications, conferencing applications, video playback application, or other suitable applications.

Tracking module 1154 may calibrate the system using one or more calibration parameters and may adjust one or more calibration parameters to reduce error in determining position of HMD 1102. For example, tracking module 1154 may adjust the focus of imaging device 1160 to obtain a more accurate position for observed locators 1106 on HMD 1102. Moreover, calibration performed by tracking module 1154 may also account for information received from IMU 1108. Additionally, if tracking of HMD 1102 is lost (e.g., imaging device 1160 loses line of sight of at least a threshold number of locators 1106), tracking module 1154 may re-calibrate some or all of the system components.

Additionally, tracking module 1154 may track the movement of HMD 1102 using, for example, slow calibration information from imaging device 1160 and may determine positions of a reference point on HMD 1102 using observed locators from the slow calibration information and a model of HMD 1102. Tracking module 1154 may additionally or alternatively determine positions of the reference point on HMD 1102 using position information from fast calibration information from IMU 1108 on HMD 1102. Additionally, tracking module 1154 may use portions of the fast calibration information, the slow calibration information, some combination thereof, and/or any other suitable positional information to predict a future location of HMD 1102, which is provided to engine 1156.

Engine 1156 may execute applications within the system and receive position information, acceleration information, velocity information, predicted future positions, some combination thereof, and/or any other suitable data for HMD 1102 from tracking module 1154. Based on the received information, engine 1156 may determine content to provide to HMD 1102 for presentation to the user, such as a virtual scene. For example, if the received information indicates that the user has looked to the left, engine 1156 may generate content for HMD 1102 that includes optical elements or tracks the user's movement in a virtual environment. Additionally or alternatively, engine 1156 may perform an action within an application executing on console 1150 in response to an action request received from the input interface 1140 and provide feedback to the user that the action was performed. The provided feedback may, for example, be visual or audible feedback via HMD 1102 and/or haptic feedback via input interface 1140.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As detailed above, the computing devices, display devices, and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A pancake lens block, comprising:
   an optical element configured to transmit at least a portion of radiation from a radiation source; and
   a first index-gradient structure spaced at a distance from the optical element, the distance configured to provide an optical path length in the pancake lens block;
   wherein the first index-gradient structure:
      is configured to provide an anti-reflective property to at least one surface of the optical element; and
      comprises a moth-eye structure that includes first protrusions on a surface of the first index-gradient structure, the first protrusions each having dimensions smaller than a wavelength of the portion of radiation.

2. The pancake lens block of claim 1, wherein the optical element comprises:
   a first retarder oriented to a first axis of orientation, where the first retarder is configured to selectively transmit a portion of the radiation from the radiation source;
   a partial reflector that receives the portion of radiation from the first retarder and transmits the portion of radiation;
   a second retarder oriented to a second axis of orientation substantially orthogonal to the first axis of orientation, where the second retarder is configured to transmit the portion of radiation from the partial reflector; and
   a reflective polarizer configured to reflect the portion of radiation transmitted by the second retarder back to the partial reflector through the second retarder, where the partial reflector reflects a second portion of the radiation from the second retarder back to the reflective polarizer.

3. The pancake lens block of claim 2, wherein a first surface of the first index-gradient structure is coupled to the surface of the second retarder.

4. The pancake lens block of claim 2, wherein the pancake lens block further comprises a second index-gradient structure configured to provide an anti-reflective property to a surface of the reflective polarizer, the second index-gradient structure coupled to the surface of the reflective polarizer at a first surface of the second index-gradient structure.

5. The pancake lens block of claim 4, wherein the second index-gradient structure comprises a second moth-eye structure and includes second protrusions on a second surface of the second index-gradient structure, the second protrusions having dimensions smaller than the wavelength of the portion of radiation.

6. The pancake lens block of claim 5, wherein at least a portion of the first protrusions or at least a portion of the second protrusions are distributed in an array having a horizontal periodicity of about 1 protrusion every 10 nm to about 500 nm.

7. The pancake lens block of claim 5, wherein the first protrusions or the second protrusions comprise at least one of conical shaped nanostructures, frustoconical shaped nanostructures, pyramid shaped nanostructures, trapezoidal shaped nanostructures, or truncated pyramid shaped nanostructures, wherein each of the first or second protrusions individually comprises a height of about 10 nm to about 1000 nm.

8. The pancake lens block of claim 4, wherein the first index-gradient structure or the second index-gradient structure comprises a film having a thickness of about 1 μm to about 20 μm.

9. The pancake lens block of claim 4, wherein at least one of (i) the first index-gradient structure is coupled to the surface of the optical element using a first adhesive material or (ii) the second index-gradient structure is coupled to the surface of the optical element using a second adhesive material.

10. The pancake lens block of claim 9, wherein the first adhesive material comprises a first index of refraction that is substantially similar to at least one of an index of refraction of the optical element or an index of refraction of the first index-gradient structure, and wherein the second adhesive material comprises a second index of refraction that is substantially similar to at least one of an index of refraction of the optical element or an index of refraction of the second index-gradient structure.

11. The pancake lens block of claim 4, wherein at least one of the first index-gradient structure or the second index-gradient structure comprises at least one of:
    an oxide material, the oxide material comprising a tungsten oxide, an iron oxide, or an aluminum oxide; or
    a polymer, the polymer comprising a silicone, a thiol, or a polyurethane.

12. The pancake lens block of claim 4, wherein the surface of the optical element is a first surface and at least one of the first index-gradient structure is nanoimprinted on the first surface of the optical element or the second index-gradient structure is nanoimprinted on a second surface of the optical element.

13. The pancake lens block of claim 4, wherein the surface of the optical element is a first surface and the second index-gradient structure is disposed on a substrate, and the substrate is laminated to a second surface of the optical element.

14. The pancake lens block of claim 4, wherein at least one of the first index-gradient structure or the second index-gradient structure has a reflectivity that is less than or equal to approximately 0.4% for incident light having from normal incidence to an angle of approximately 30 degrees with respect to normal over a wavelength range of approximately 430 nm to approximately 660 nm.

15. The pancake lens block of claim 1, wherein the distance is provided by at least one of an air gap or a material.

16. The pancake lens block of claim 1, wherein the surface of the optical element is a first surface and the first index-gradient structure is disposed on a substrate, and the substrate is laminated to the first surface of the optical element.

17. The pancake lens block of claim 1, wherein the surface of the optical element is a first surface and at least one of the first surface or a second surface of the optical element is convex, concave, flat, or irregular.

18. A head mounted display (HMD) comprising:
    an electronic display configured to emit image light; and
    a pancake lens block comprising:
        an optical element configured to transmit at least a portion of the image light; and
        a first index-gradient structure spaced at a distance from the optical element;
    wherein:
        the distance is configured to provide an optical path length in the pancake lens block; and
        the first index-gradient structure is configured to provide an anti-reflective property to a surface of the optical element and comprises a moth-eye structure that includes first protrusions on a surface of the first index-gradient structure, the first protrusions each having dimensions smaller than a wavelength of the portion of image light.

19. A method comprising:
    configuring an optical element within a pancake lens block to transmit at least a portion of radiation from a radiation source; and
    spacing a first index-gradient structure at a distance from the optical element, wherein:
        the distance is configured to provide an optical path length in the pancake lens block; and
        the first index-gradient structure is configured to provide an anti-reflective property to a surface of the optical element and comprises a moth-eye structure that includes first protrusions on a surface of the first index-gradient structure, the first protrusions each having dimensions smaller than a wavelength of the portion of radiation.

* * * * *